United States Patent
Larzul et al.

(10) Patent No.: US 12,205,006 B2
(45) Date of Patent: Jan. 21, 2025

(54) ACCELERATING NEURON COMPUTATIONS IN ARTIFICIAL NEURAL NETWORKS BY SKIPPING BITS

(71) Applicant: Mipsology SAS, Palaiseau (FR)

(72) Inventors: Ludovic Larzul, El Dorado Hills, CA (US); Vincent Moutoussamy, Montrouge (FR); Benoit Chappet de Vangel, Paris (FR)

(73) Assignee: Mipsology SAS, Palaiseau (FR)

( * ) Notice: Subject to any disclaimer, the term of this patent is extended or adjusted under 35 U.S.C. 154(b) by 1349 days.

(21) Appl. No.: 16/364,538

(22) Filed: Mar. 26, 2019

(65) Prior Publication Data

US 2020/0311511 A1 Oct. 1, 2020

(51) Int. Cl.
*G06N 3/02* (2006.01)

(52) U.S. Cl.
CPC .................................... *G06N 3/02* (2013.01)

(58) Field of Classification Search
CPC ........................................................ G06N 3/02
See application file for complete search history.

(56) References Cited

U.S. PATENT DOCUMENTS

| | | | |
|---|---|---|---|
| 10,058,290 B1 * | 8/2018 | Proud | A61B 5/749 |
| 11,049,013 B1 * | 6/2021 | Duong | G06N 3/08 |
| 11,263,517 B1 * | 3/2022 | Diamant | G06N 3/048 |
| 11,423,289 B2 * | 8/2022 | Judd | G06N 3/045 |
| 2019/0042922 A1 * | 2/2019 | Pillai | G06F 17/11 |
| 2019/0080226 A1 * | 3/2019 | Lee | G06N 3/048 |
| 2019/0147327 A1 * | 5/2019 | Martin | G06F 17/15 |

FOREIGN PATENT DOCUMENTS

| | | | |
|---|---|---|---|
| EP | 3319015 A1 | 5/2018 | |
| EP | 3407183 A2 | 11/2018 | |

OTHER PUBLICATIONS

Kim Dongyoung et al: "A novel zero weight/activation-aware hardware architecture of convolutional neural network", Design, Automation & Test in Europe Conference & Exhibition (DATE), 2017, EDAA, Mar. 27, 2017 (Mar. 27, 2017), pp. 1462-1467, XP033096588, DOI: 10.23919/DATE.2017.7927222 [retrieved on May 11, 2017], abstract, p. 1464, left-hand column, line 1-p. 1465, right-hand column, line 3, figures 1-4.

(Continued)

*Primary Examiner* — Van C Mang
(74) *Attorney, Agent, or Firm* — Georgiy L. Khayet

(57) ABSTRACT

Systems and methods for accelerating neuron computations in artificial neural network (ANN) are provided. An example method may comprise receiving, for calculation of a neuron of an ANN, a plurality of first values represented by A bits and a plurality of second values represented by B bits, splitting each value of the plurality of the first values into a set of parts, a count of bits of each of set of parts being less than A, to obtain a set of pluralities of parts, selectively performing mathematical operations on a first plurality of the set of pluralities and the plurality of the second values to obtain a first result, selectively performing further mathematical operations on further pluralities of the set of pluralities and the plurality of the second values to obtain further results, and determining, based on the first result and the further results, an output of the neuron.

18 Claims, 16 Drawing Sheets

(56) References Cited

OTHER PUBLICATIONS

Song Han e tal: "EIE", ACM SIGARCH Computer Architecture News, ACM Special Interest Group on Computer Architecture, 2 Penn Plaza, Suite 701, New York, NY 10121-0701 USA, vol. 44, No. 3, Jun. 18, 2016 (Jun. 18, 2016), pp. 243-254, XP058300624, ISSN: 0163-5964, DOI: 10.1145/3007787.3001163, abstract, p. 244, left-hand column, line 6-p. 247, left-hand column, line 50, figures 1-4.

* cited by examiner

ACCELERATING NEURON COMPUTATIONS IN ARTIFICIAL NEURAL NETWORKS BY SKIPPING BITS

TECHNICAL FIELD

The present disclosure relates generally to data processing and, more particularly, to system and method for accelerating neuron computations in artificial neural networks by skipping bits.

BACKGROUND

Artificial Neural Networks (ANNs) are simplified and reduced models reproducing behavior of human brain. The human brain contains 10-20 billion neurons connected through synapses. Electrical and chemical messages are passed from neurons to neurons based on input information and their resistance to passing information. In the ANNs, a neuron can be represented by a node performing a simple operation of addition coupled with a saturation function. A synapse can be represented by a connection between two nodes. Each of the connections can be associated with an operation of multiplication by a constant. The ANNs are particularly useful for solving problems that cannot be easily solved by classical computer programs.

While forms of the ANNs may vary, they all have the same basic elements similar to the human brain. A typical ANN can be organized into layers, each of the layers may include many neurons sharing similar functionality. The inputs of a layer may come from a previous layer, multiple previous layers, any other layers or even the layer itself. Major architectures of ANNs include Convolutional Neural Network (CNN), Recurrent Neural Network (RNN) and Long Term Short Memory (LTSM) network, but other architectures of ANN can be developed for specific applications. While some operations have a natural sequence, for example a layer depending on previous layers, most operations can be carried out in parallel within the same layer. The ANNs can then be computed in parallel on many different computing elements similar to neurons of the brain. A single ANN may have hundreds of layers. Each of the layers can involve millions of connections. Thus, a single ANN may potentially require billions of simple operations like multiplications and additions.

Because of the larger number of operations and their parallel nature, ANNs can result in a very heavy load for processing units (e.g., CPU), even ones running at high rates. Sometimes, to overcome limitations of CPUs, graphics processing units (GPUs) can be used to process large ANNs because GPUs have a much higher throughput capacity of operations in comparison to CPUs. Because this approach solves, at least partially, the throughput limitation problem, GPUs appear to be more efficient in the computations of ANNs than the CPUs. However, GPUs are not well suited to the computations of ANNs because the GPUs have been specifically designed to compute graphical images.

The GPUs may provide a certain level of parallelism in computations. However, the GPUs are constraining the computations in long pipes implying latency and lack of reactivity. To deliver the maximum throughput, very large GPUs can be used which may involving excessive power consumption, a typical issue of GPUs. Since the GPUs may require more power consumptions for the computations of ANNs, the deployment of GPUs can be difficult.

To summarize, CPUs provide a very generic engine that can execute very few sequences of instructions with a minimum effort in terms of programming, but lack the power of computing for ANN. GPUs are slightly more parallel and require a larger effort of programming than CPUs, which can be hidden behind libraries with some performance costs, but are not very well suitable for ANNs.

Field Programmable Gate Arrays (FPGAs) are professional components that can be programmed at the hardware level after they are manufactured. The FPGAs can be configured to perform computations in parallel. Therefore, FPGAs can be well suited to compute ANNs. One of the challenges of FPGAs is the programming, which requires a much larger effort than programming CPUs and GPUs. Adaption of FPGAs to perform ANN computations can be more challenging than for CPUs and GPUs.

Most attempts in programming FPGAs to compute ANNs have being focusing on a specific ANN or a subset of ANNs, or requiring to modify the ANN structure to fit into a specific limited accelerator, or providing a basic functionality without solving the problem of computing ANN on FPGAs globally. The computation scale is typically not taken into account for existing FPGA solutions, many of the research being limited to a single or few computation engines, which could be replicated. The existing FPGA solutions do not solve the problem of massive data movement required at large scale for the actual ANN involved in real industrial applications. The inputs to be computed with an ANN are typically provided by an artificial intelligence (AI) framework. Those programs are used by the AI community to develop new ANN or global solutions based on ANN. Furthermore, the FPGAs lack integration in those software environments.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an example embodiment, a system for accelerating neuron computations in ANN is provided. The system may include one or more processing units configured to receive a plurality of first values represented by A bits and a plurality of second values represented by B bits. The plurality of the first values and the plurality of the second values can be used for calculation of a neuron of an ANN. The processing units can be configured to split each first value of the plurality of the first values into a set of parts to obtain a set of pluralities of parts of the first values, wherein a count of bits of each part of the set of the parts is less than A. The processing units can selectively perform mathematical operations on a first plurality of the set of the pluralities of the parts of the first values and the plurality of the second values to obtain a first result. The processing units can selectively perform further mathematical operations on further pluralities of the set of the pluralities of the parts and the plurality of the second values to obtain further results. The processing units can determine, based on the first result and the further results, an output of the neuron. In some embodiments, the mathematical operation and the further mathematical operations include a selective multiplication and an accumulation of the parts of the first values and the second values.

Each part of the first plurality may include first C bits of a first value from the plurality of first values. The first C bits may start with the most significant bit in the first value.

Each first value of the plurality of first values can be split into a first part and a second part, wherein the first part is C bits of the first value and the second part is either C, C+1, or C−1 further bits of the first value and a sum of a bit count of the first part and a bit count of the second part is A.

Each first value of the plurality of the first values may represent an input value for the neuron of the ANN and the plurality of the seconds values may include a weight for the input value. Alternatively, each first value of the plurality of the first values may represent a weight for an input value of the neuron of the ANN and the plurality of the seconds values may include the input value.

Selectively performing the mathematical operations on the first plurality of the set of plurality of the parts of the first values and the plurality of the second values may include determining, for each part of the first plurality, that the part satisfies criteria. Upon the determination, the part can be multiplied by corresponding second value of the plurality of the second values to obtain a product. The product can be added to the first result. After selectively performing the operations for all parts of the first plurality, the first result can be binary shifted by A-C bits. The multiplication of the part and the second value can be performed by an arithmetic unit configured to operate on the first operand of less than A bits and the second operand of B bits. Determining that the part satisfies criteria may include determining that the part is a number exceeding a positive threshold or not exceeding a negative threshold.

The processing units can be configured to determine that the first result exceeds a positive threshold or does not exceed a negative threshold. In response to the determination, processing units may skip performing the further mathematical operations on the further plurality of the set of the pluralities of the parts of the first values and the plurality of the second values to obtain the further results.

Selectively performing the mathematical operations on the further pluralities of the set of the pluralities of the parts of the first values and the plurality of the second values may include, for each further part of each of the further pluralities, determining that the further part satisfy criteria. In response to determination, the further part can be multiplied by a corresponding second value of the plurality of the second values to obtain a product. The product can be added to the further results.

Determining that the further part satisfies the criteria may include determining that the further part is a number exceeding a positive threshold or not exceeding a negative threshold.

Determining that the further part satisfies the criteria may include determining that the first result does not exceed a first positive threshold or exceeds a first negative threshold and the further part is a number exceeding a second positive threshold or not exceeding a second negative threshold.

Determining that the further part satisfies the criteria may include determining that an absolute value of the further part is a number exceeding a percentage of an absolute value of the first result.

The processing units can be configured to, after splitting each first value of the plurality of first values into the set of parts, split each second value of the plurality of second values into a further set of parts to obtain a further set of pluralities of parts. A count of bits of each part of the further set of the parts can be less than B. The processing units can further selectively perform mathematical operations on the first plurality of the set of the pluralities of the parts and the first further plurality of the further set of pluralities of parts to obtain the first partial result. The processing unit may determine that the first partial result does not satisfy criteria. In response to the determination, the processing units can selectively perform further mathematical operations on further pluralities of the set of the pluralities of the parts and further pluralities of the further set of pluralities of parts to obtain at least one further partial result. The processing unit may determine, based on the first partial result and the further partial result, the output of the neuron of the ANN.

According to another example embodiments, a system for accelerating neuron computations in ANN may include one or more processing units configured to receive a plurality of first values represented by A bits and a plurality of second values represented by B bits. The plurality of the first values and the plurality of the second values can be used for calculation of a neuron of an ANN. For each first value of the plurality of first values, the processing units may select C bits from the first value, wherein C<A. The processing units may determine an offset of the selected C bits from a position of the least significant bit in the first value. The processing units may determine that the selected C bits and the offset satisfy criteria. In response to the determination, the processing units may perform a mathematical operation on the selected C bits and corresponding second value of the plurality of second values to obtain a result. The processing units may binary shift the result by the offset. The processing units may add the result to a sum, wherein the sum can be used to compute an output of the neuron.

Selecting the C bits from the first value may include selecting C consecutive bits starting with a first non-zero bit after a most significant bit. Selecting the C bits from the first value may include selecting two or more C consecutive bit strings starting with two and more pre-determined bit positions in the first value.

Determining that the selected C bits and the offset satisfy criteria may include determining that the offset exceeds a threshold, wherein the threshold depends on a value of the sum.

The processing units can be configured in response to the criteria to perform a mathematical operation on the selected C bits and corresponding second value of the plurality of second values to obtain a result. The processing units can be configured to add the result to a partial sum. The processing units can be configured to binary shift the partial sum by the offset and add the shifted partial sum to the sum to be used to compute the output of the neuron.

According to another example embodiment, a method for accelerating neuron computations in the ANN is provided. The method may include receiving, by one or more processing units, a plurality of first values represented by A bits and a plurality of second values represented by B bits. The plurality of the first values and the plurality of the second values can be used for calculation of a neuron of an ANN. The method may select, by the processing units, one or more parts of each value from the plurality of the first values to obtain one or more pluralities of parts of the first values, wherein the count of bits of each of the one or more parts is less than A. The method may selectively perform, by the processing units, mathematical operations on the one or more pluralities of parts of the first values and the plurality of the second values to obtain a result. The method may determine, by the processing units and based on the result, an output of the neuron.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

Figure 1:
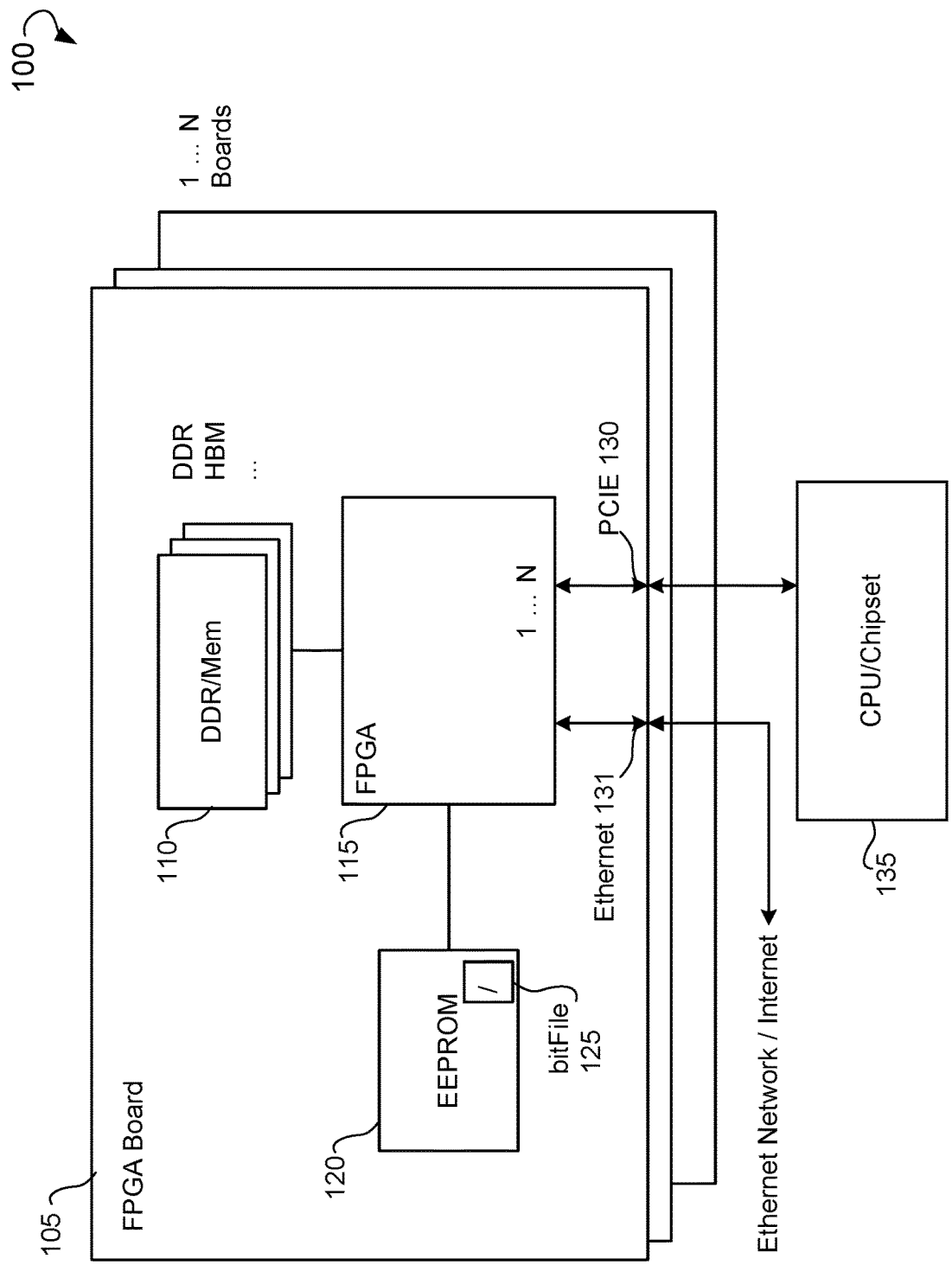
FIG. 1 is a block diagram showing an example system wherein a method for acceleration of ANN computations can be implemented, according to some example embodiments.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

For purposes of this document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Embodiments of this disclosure are concerned with methods and systems for accelerating neuron computations in ANNs. Embodiments of present disclosure may accelerate computation of neurons in ANNs by skipping redundant bitwise operations. According to some example embodiments of the present disclosure, input values for a neuron in an ANN and/or weights for ANN can be split into first parts of bits and seconds parts of bits. Computations of neuron can be further performed by selectively performing bitwise mathematical operations on the first parts of bits and the second parts of bits. During the neuron computations, the bitwise mathematical operations can be skipped if either the first parts or the second parts are substantially zero. Other embodiments of the present disclosure may allow selecting only most significant bits of the input values for a neuron and/or weights of the input values and performing bitwise mathematical operation only on selected bits and by so reducing number of bitwise operations and reducing size of integrated circuits required for implementation of neuron computations.

While some embodiments of the present disclosure are described herein in reference to operations of FPGAs, the present technology may be also practiced with application-specific integrated circuits (ASICs), programmable logic devices, transistor-based circuits, or various combinations thereof. The methods described herein can be also implemented by hardware modules, software modules, or combinations of both. The methods can also be embodied in computer-readable instructions stored on computer-readable media.

The term "module" shall be construed to mean a hardware device, software, or a combination of both. For example, a hardware-based module can use one or more microprocessors, FPGAs, application-specific integrated circuits (ASICs), programmable logic devices, transistor-based circuits, or various combinations thereof. Software-based modules can constitute computer programs, computer program procedures, computer program functions, and the like. In addition, a module of a system can be implemented by a computer or server, or by multiple computers or servers interconnected into a network. Alternatively, module may also refer to a subpart of a computer system, a hardware device, an integrated circuit, or a computer program.

Technical effects of certain embodiments of the present disclosure can include configuring integrated circuits, FPGAs, or computer systems to perform ANN computations without execution of redundant and unnecessary mathematical operations, thereby accelerating the ANN computations. Further technical effects of some embodiments of the present disclosure can facilitate configuration of integrated circuits, FPGAs, or computer systems to dynamically qualify data on which mathematical operations are to be performed in the ANN computations. Yet further technical effects of embodiments of the present disclosure include reducing size of integrated circuits, FPGAs, or computer systems required to implement computation of neurons in ANN.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 is a block diagram showing an example system 100, wherein a method for accelerating neuron computations in ANN can be implemented, according to some example embodiments. The system 100 can be part of a computing system, such as a personal computer, a server, a cloud-based computing recourse, and the like. The system 100 may include one or more FPGA boards 105 and a chipset 135 including a least one CPU. The chipset 135 can be communicatively connected to the FPGA boards 105 via a communication interface. The communication interface may include a Peripheral Component Interconnect Express (PCIE) standard 130. The communication interface may also include an Ethernet connection 131.

The FPGA board 105 may include an FPGA 115, a volatile memory 110, and a non-volatile memory 120. The volatile memory 110 may include a double data rate synchronous dynamic random-access memory (DDR SDRAM), High Bandwidth Memory (HBM), or any other type of memory. The volatile memory 110 may include the host memory. The non-volatile memory 120 may include Electrically Erasable Programmable Read-Only Memory (EEROM), a solid-state drive (SSD), a flash memory, and so forth.

The FPGA 115 can include blocks. The blocks may include a set of elementary nodes (also referred to as gates) performing basic hardware operations, such as Boolean operations. The blocks may further include registers retaining bit information, one or more memory storage of different sizes, and one or more digital signal processors (DSPs) to perform arithmetic computations, for example, additions and multiplications. Programming of FPGA 115 may include configuring each of the blocks to have an expected behavior and connecting the blocks by routing information between the blocks. Programming of FPGA 115 can be carried out using a result from a compiler taking as input schematic description, gate-level description, hardware languages like Verilog, System Verilog, or Very High Speed Integrated Circuit Hardware Description Language (VHDL), or any combination of thereof.

The non-volatile memory 120 may be configured to store instructions in a form of bit file 125 to be executed by the FPGA 115. The FPGA 115 can be configured by the instructions to perform one or more floating point operations or bitwise operations including multiplication and addition to calculate sum of products that can be used in neural network computations.

The volatile memory 110 may be configured to store weights W[i] for neurons of one or more ANNs, input values V[i] to be processed for the ANNs, and results of ANNs computation including any intermediate results of computations of layers of the ANNs.

Figure 2:
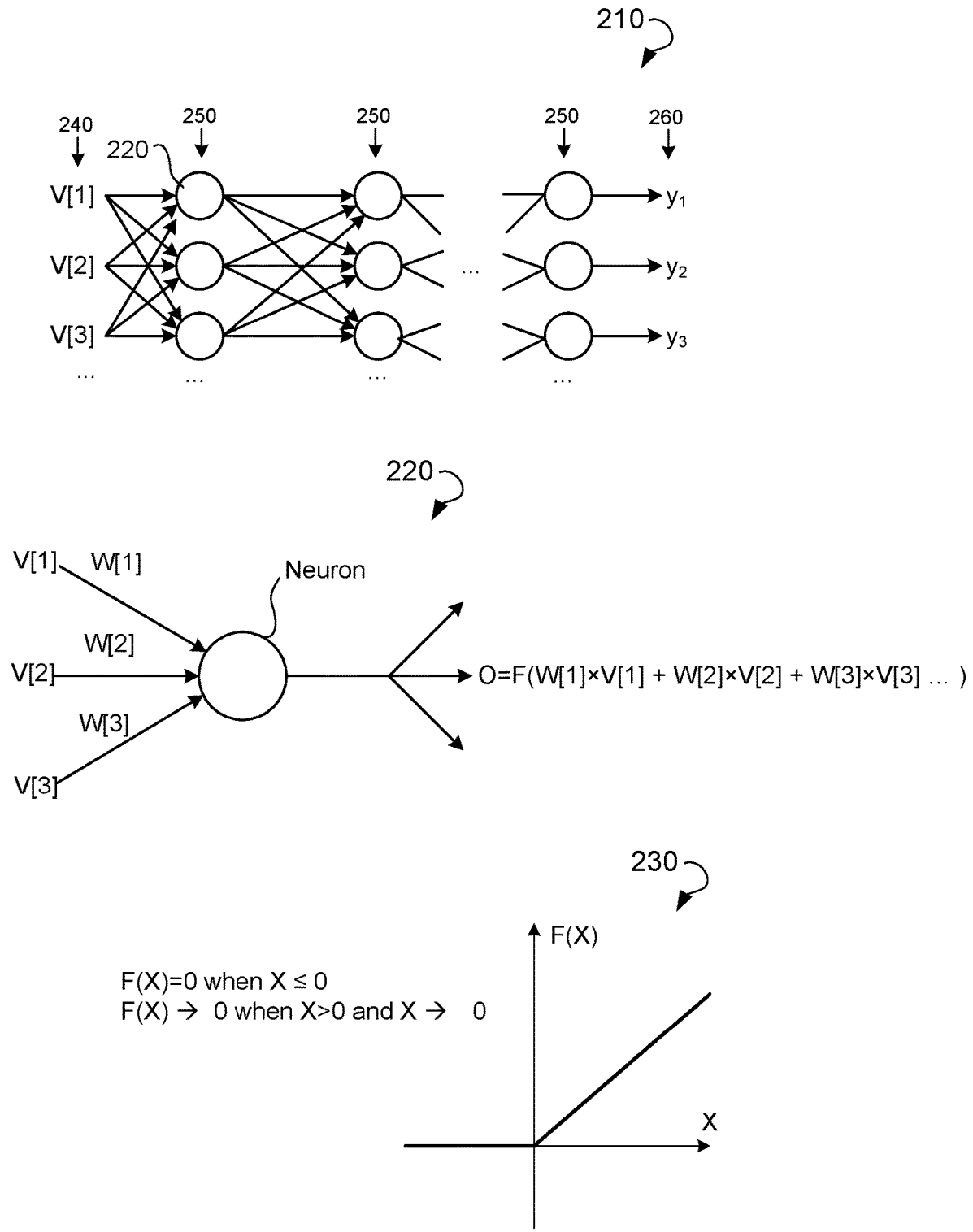
FIG. 2 shows an ANN, neuron, and transfer function, according to an example embodiment.

FIG. 2 shows ANN 210, neuron 220, and transfer function 230, according to some example embodiments. The ANN 210 may include one or more input layers 240, one or more hidden layers 250, and one or more output layers 260. Each of the input layers, hidden layers, and output layers may include one or more (artificial) neurons 220. The number of neurons can be different for different layers.

Each of neurons 220 may represent a calculation of a mathematical function $$O = F\left(\sum_{i=1}^{n} V[i] \times W[i]\right) \quad (1)$$

wherein V[i] are neuron input values, W[i] are weights assigned to input values at neuron, and F(X) is a transfer function. Typically, the transfer function 230 F(X) is selected to be zero for X<0 and have a limit of zero as X approaches zero. For example, the transfer function F(X) can be in the form of a sigmoid. The result of calculation of a neuron propagates as an input value of further neurons in the ANN. The further neurons can belong to either the next layer, previous layer or the same layer.

It should be noted that while the ANN 210 illustrated in FIG. 2 can be referred to as a feedforward neural network, embodiments of the present disclosure can be also used in computations of convolutional neural networks, recurrent neural networks, long short-term memory networks, and other types of ANNs.

Figure 3:
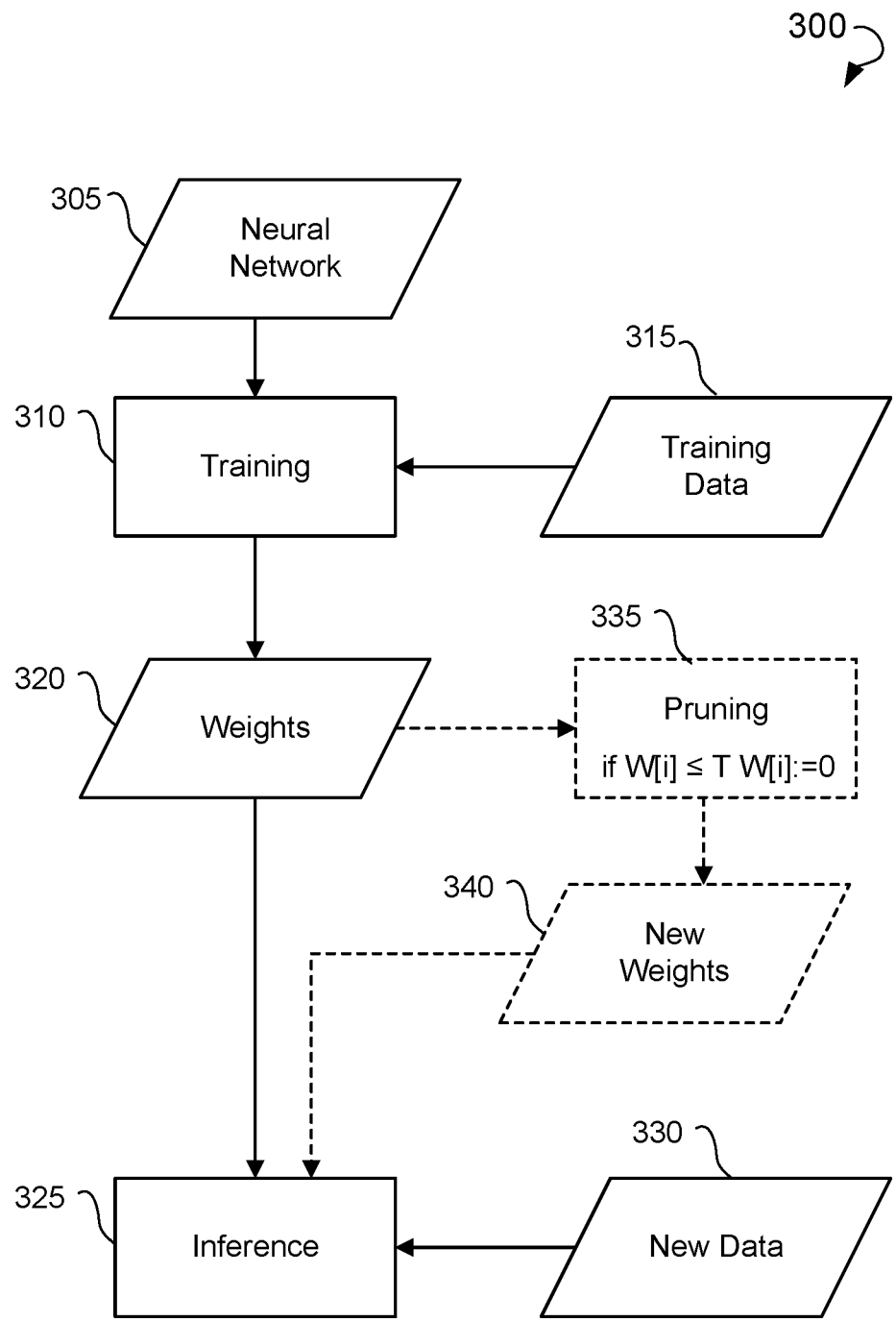
FIG. 3 is a flow chart showing training and inference of ANN, according to some example embodiments.

FIG. 3 is a flow chart 300 showing training 310 and inference 325 of an ANN, according to some example embodiments. The training 310 (also known as learning) is a process of teaching ANN 305 to output a proper result based on a given set of training data 315. The process of training may include determining weights 320 of neurons of the ANN 305 based on training data 315. The training data 315 may include samples. Each of the samples may be represented as a pair of input values and an expected output. The training data 315 may include hundreds to millions of samples. While the training 310 is required to be performed only once, it may require a significant amount of computations and take a considerable time. The ANNs can be configured to solve different tasks including, for example, image recognition, speech recognition, handwriting recognition, machine translation, social network filtering, video games, medical diagnosis, and so forth.

The inference 325 is a process of computation of an ANN. The inference 325 uses the trained ANN weights 320 and new data 330 including new sets of input values. For each new set of input values, the computation of the ANN provides a new output which answer the problem that the ANN is supposed to solve. For example, an ANN can be trained to recognize various animals in images. Correspondingly, the ANN can be trained on millions of images of animals. Submitting a new image to the ANN would provide the information for animals in the new image (this process being known as image tagging). While the inference for each image takes less computations than training, number of inferences can be large because new images can be received from billions of sources.

The inference 325 includes multiple computations of sum of products:

$$\sum_{i=1}^{n} V[i] \times W[i] \quad (2)$$

wherein the V[i] are new input values and W[i] are weights associated with neurons of ANN. Some previous approaches for performing inference include inspection of the weights W[i] and replacing some of the weights W[i] with zero values if a value of the weight is relatively small when compared to other weights of the ANN. In FIG. 3, this process is shown as pruning 335. The pruning 335 generates new weights 340 that then can be used in inference 325 instead of the weights 320. Advantage of these approaches is that replacing the weights with zero values may allow decreasing the number of computations of the ANN, since multiplications by zero can be avoided in computations. The disadvantage of these approaches is that the ANN can become less accurate in producing a correct output due to lack of correspondence between the new weights 340 and training data 315 used in training of ANN. Another disadvantage of these approaches is that the pruning of weights is not based on new input values and allow only to avoid operations with weights equal to zero.

Figure 4:
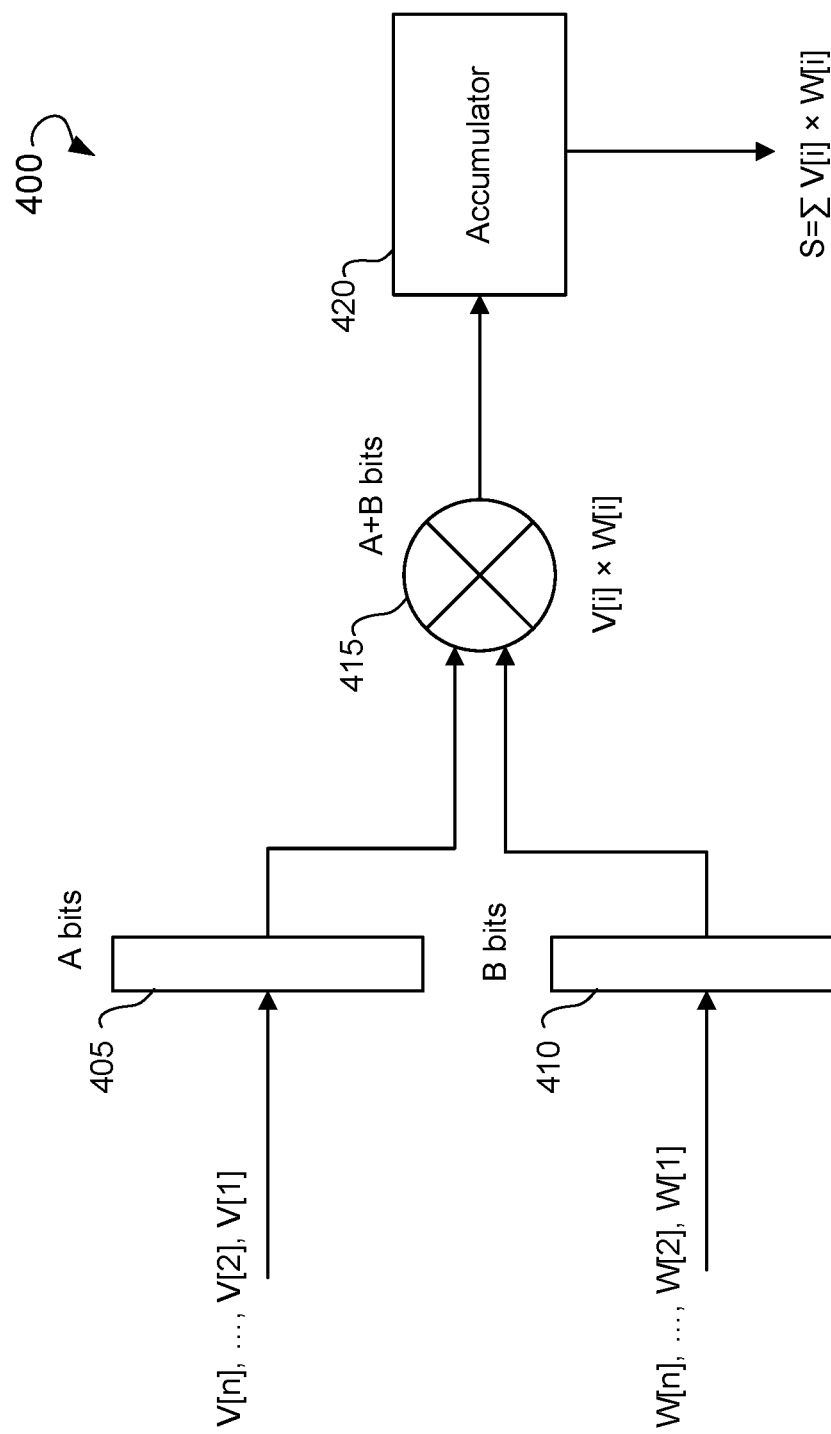
FIG. 4 is a block diagram showing an example system for neuron computations in ANN.

FIG. 4 is a block diagram showing an example system 400 for neuron computations in ANN. The system 400 of FIG. 4 may perform a conventual method for computations of a sum of product of input values $\{V[i]\}$ and weights $\{W[i]\}$ (i=1, ..., n). The system 400 can be implemented using FPGA 115. The system 400 may include registers 405 and 410 for receiving input values $\{V[i]\}$ and weights $\{W[i]\}$, an arithmetic unit 415 for performing multiplication of input values $\{V[i]\}$ and weights $\{W[i]\}$, and an accumulator 420 for adding the result of the multiplication to a sum. If each the input values $\{V[i]\}$ includes A bits and each of the weights $\{W[i]\}$ includes B bits, then at least A+B bits are required to store the product V[i]×W[i] and the sum S.

Figure 5:
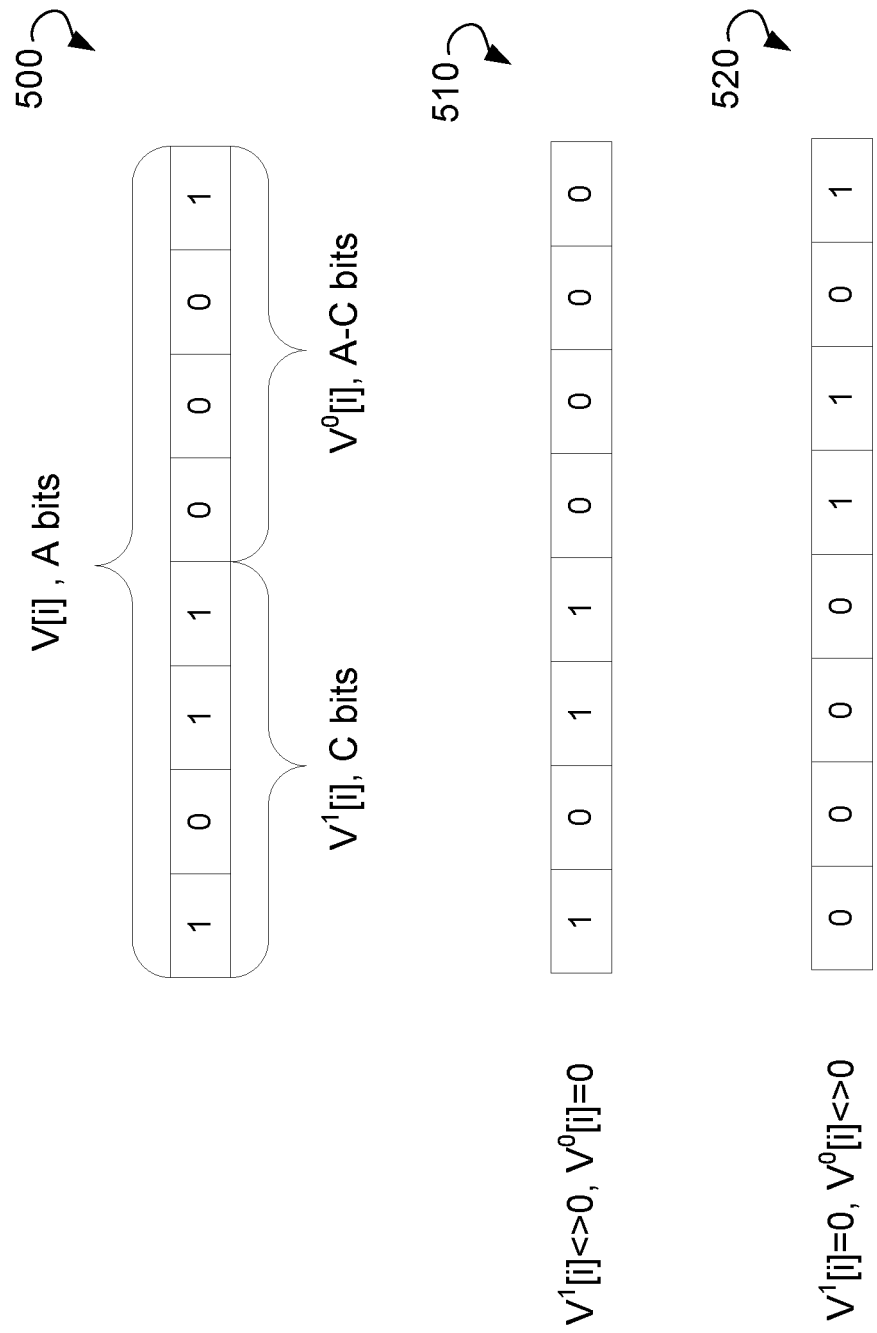
FIG. 5 is block diagram showing example input values for neuron in ANN.

FIG. 5 is block diagram showing example input values V[i] 500, 510, and 520 for a neuron of ANN. In example of FIG. 5 the input values V[i] can include 8 bits and each of the two parts include 4bits. However, embodiments of the present disclosure can be used for input values and weights including other number of bits. Each input values and weights can be split into more than two equal parts or more than two non-equal parts of bits. The input values V[i] can be spitted into a first part $V^1[i]$ and a second part $V^0[i]$. The first part $V^1[i]$ may include first C bits starting with a position of the most significant bit in V[i]. The second part $V^0[i]$ can include the A-C bits starting at position of the C+1 bit. During computations of the neuron of ANN, set of input values $\{V[i]\}$ may include a substantial number of inputs values wherein either $V^1[i]\neq 0$ and $V^0[i]=0$ or $V^1[i]=0$ and $V^0[i]\neq 0$. In FIG. 5, the input value 510 is an example input value, wherein $V^1[i]\neq 0$ and $V^0[i]=0$, and the input value 520 is an example input value, wherein $V^1[i]=0$ and $V^0[i]\neq 0$. Therefore, bitwise multiplications V[i]×W[i] may include a substantial number of unnecessary operations of multiplying by zero.

According to some embodiments of the present disclosure, performing the unnecessary operations can be avoided or reduced by performing, separately, multiplications $V^1[i]\times W[i]$ and multiplications $V^0[i]\times W[i]$ to obtain a first result $S^1=\Sum_{i=1}^{n} V^1[i]\times W[i]$ and a second result $S^0=\Sum_{i=1}^{n} V^0[i]\times W[i]$. During the computations, multiplication $V^1[i]\times W[i]$ can be skipped if $V^1[i]=0$ and multiplication $V^0[i]\times W[i]$ can be skipped if $V^0[i]=0$. The total sum $S=\Sum_{i=1}^{n} V[i]\times W[i]$ can be further calculated as $S=S^0+S^1\times 2^{A-C-1}$, wherein the multiplication by $2^{A-C-1}$ can be carried out as a simple value shift that does not require adding any silicon logic to perform the multiplication.

Figure 6:
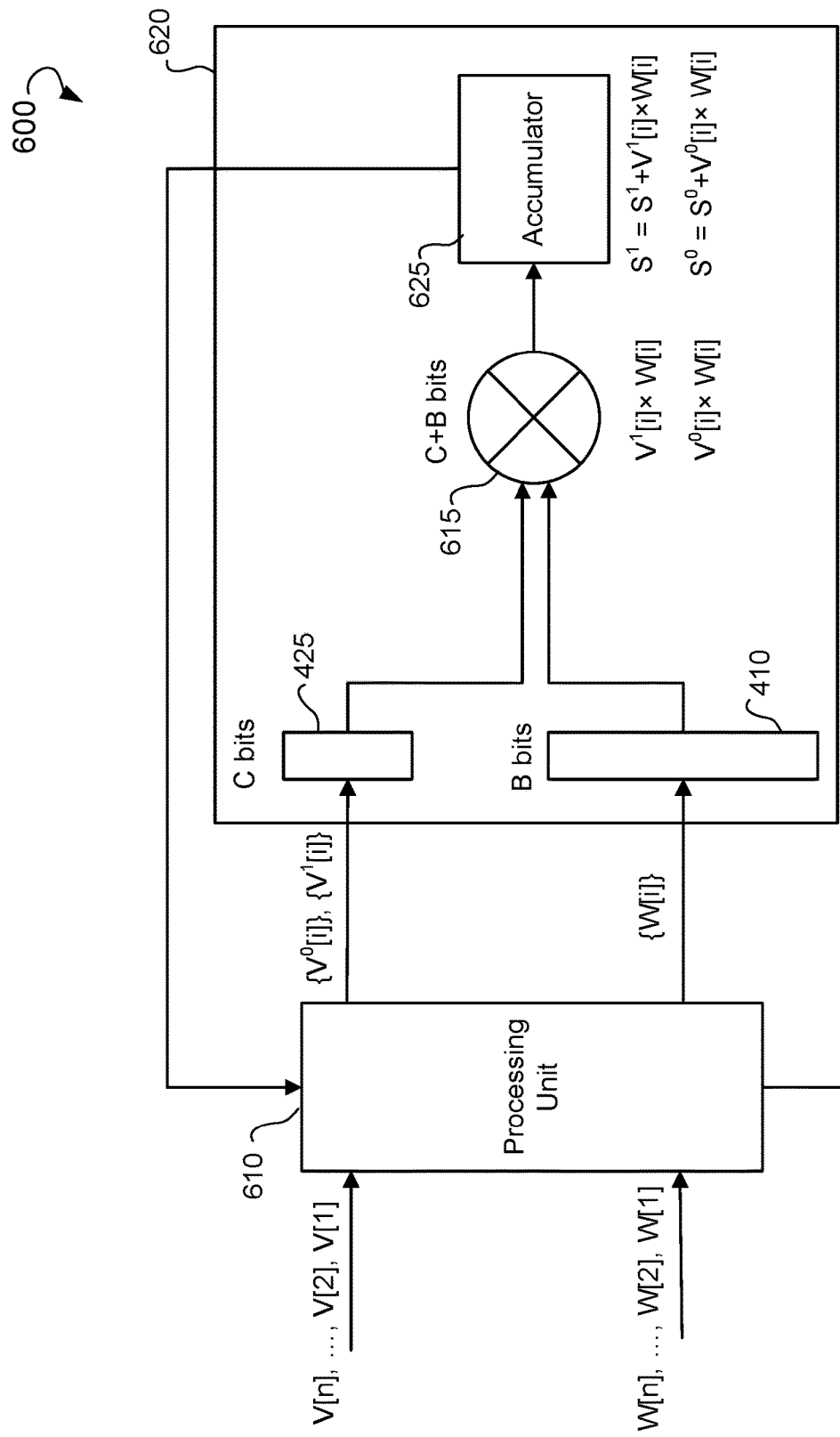
FIG. 6 is a block diagram showing an example system for accelerating neuron computations in ANN, according to an example embodiment of the present disclosure.

FIG. 6 is a block diagram showing an example system 600 for accelerating neuron computations in ANN, according to an example embodiment of the present disclosure. The system 600 may include a processing unit 610 and one or more multiply-accumulate (MAC) unit(s) 620. The MAC unit 620 may include a C-bit register 425, a B-bit register 410, an arithmetic unit 615 and an accumulator 625. The processing unit 610 and MAC unit(s) 620 may include at least one electronic component accelerating the computation of one or more neurons of the ANN. The processing unit 610 and/or MAC unit(s) 620 can be implemented using FPGA 115.

The processing unit 610 can be configured to receive input values $\{V[i]\}$ and weights $\{W[i]\}$ for computations of a neuron of ANN. Each of the input values V[i] can include A bits and each of the weights W[i] can include B bits. The processing unit 610 can split each input value V[i] in a first part of C bits and a second part of A-C bits to obtain a plurality of first parts $\{V^1[i]\}$ and a plurality of second parts $\{V^0[i]\}$. In some embodiments, C can be equal to one half of A. In other embodiments, the processing unit 610 can be configured to receive the plurality of first parts $\{V^1[i]\}$ and the plurality of second parts $\{V^0[i]\}$ from a further processing unit.

The processing unit 610 can further calculate separately, using one or more MAC unit(s) 620, the first result $S^1=\Sum_{i=1}^{n} V^1[i]\times W[i]$ and a second result $S^0=\Sum_{i=1}^{n} V^0[i]\times W[i]$. The processing unit 610 may further calculate the total sum $S=S^0+S^1\times 2^{A-C-1}$. The first result $S^1$ and second result $S^0$ can be calculated in parallel or subsequently. During computations of the first result or the second result, the processing unit 610 may be configured to skip multiplication $V^1[i]\times W[i]$ if $V^1[i]\neq 0$ and multiplication $V^0[i]\times W[i]$ if $V^0[i]=0$ to avoid unnecessary operations.

The arithmetic unit 615 can be configured to perform multiplication of C bits by B bits. Therefore, the arithmetic unit 615 may require only C+B bits for storing result of multiplication of C bits and B bits for calculation of $V^1[i]\times W[i]$. Accumulator 625 may require at least C+B bits to keep result of summation, which can be less than A+B bits that would be required in a conventional MAC unit (for example, system 400 of FIG. 4). Reducing number of bits required by arithmetic unit 615 and accumulator 625 may result in reducing size of integrated circuits, such as FPGAs, for implementing the MAC unit 620.

Figure 7:
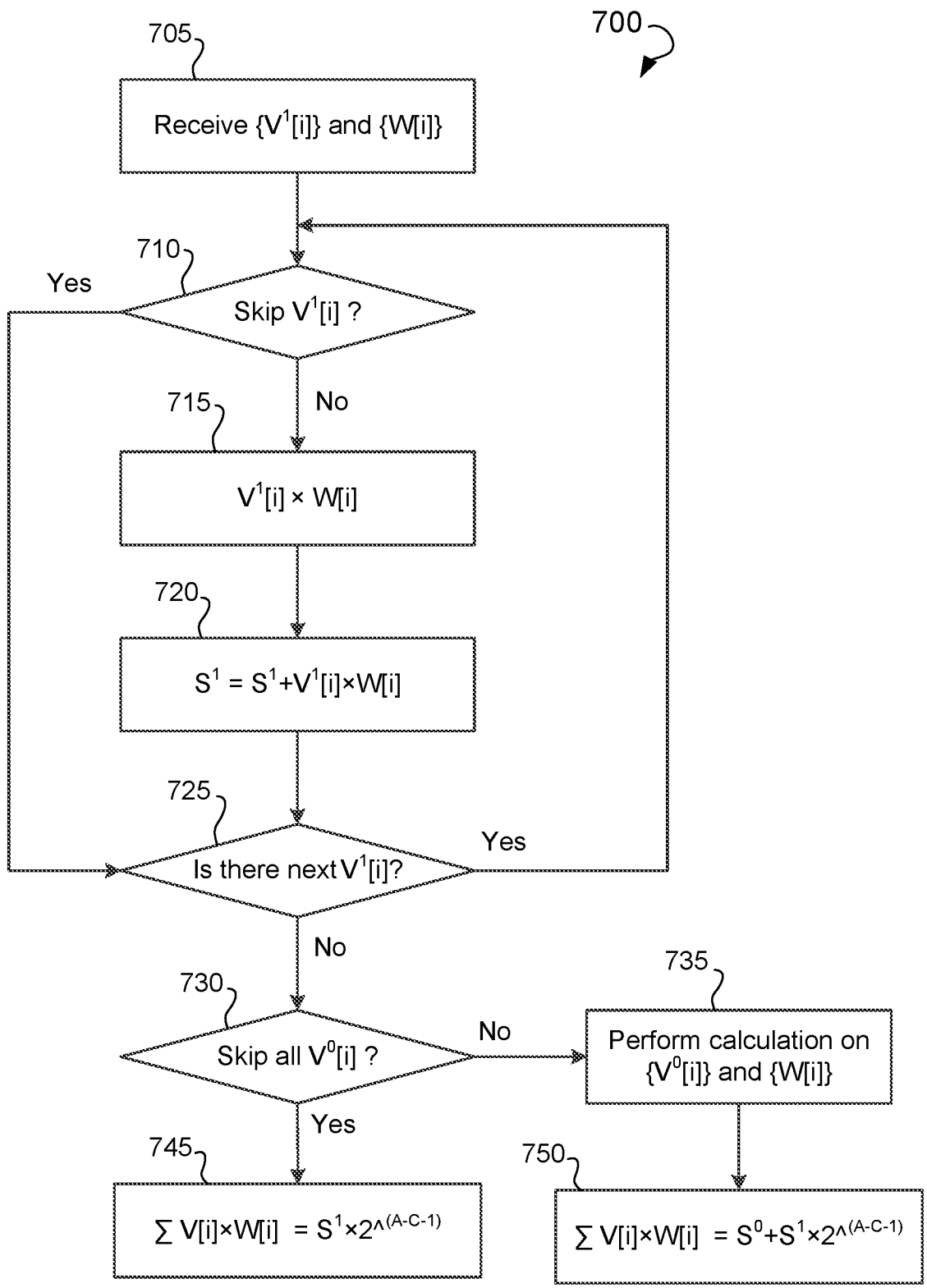
FIG. 7 is a flow chart showing an example method for accelerating neuron computations in ANN, according to an example embodiment.

FIG. 7 is a flow chart showing an example method 700 for accelerating neuron computations in ANN, according to an example embodiment. The method 700 can be implemented using the system 600 of FIG. 6.

In block 705, the method may receive, by the processing unit 610, a plurality of first parts $\{V^1[i]\}$ and weights $\{W[i]\}$. The first parts $V^1[i]$ may include the first C bits of the input values V[i] for a neuron of ANN.

In decision block 710, the method 700 may determine, by the processing unit 610, that value $V^1[i]$ can be skipped in the multiplications $V^1[i]\times W[i]$. For example, the value $V^1[i]$ can be skipped if $V^1[i]=0$ or if $V^1[i]$ does not exceed a positive threshold and exceeds a negative threshold. If $V^1[i]$ can be skipped, the method 700 may proceed to block 725. If $V^1[i]$ cannot be skipped, then the method 700 proceeds to block 715.

In block 715, the method 700 can multiply, by the arithmetic unit 615, value $V^1[i]$ and corresponding weight W[i]. In block 720, the method may add, by the accumulator 625, result of the multiplication to a first result $S^1$.

In block 725, the method 700 may determine, by the processing unit 610, that there is a next value $V^1[i]$. If there is the next value $V^1[i]$ the method 700 may proceed to the decision block 710 for repeating blocks 710, 715, 720, and 725. If there are no next values $V^1[i]$, the method 700 may proceed to decision block 730.

In the decision block 730, the method 700 may determine that all values $\{V^0[i]\}$, which are the second parts of the input values $\{V[i]\}$ can be skipped from further computations of the neuron. For example, all second parts can be skipped from further computations of the neuron, if the first result $S^1$ is positive and exceeds a positive threshold, the first result $S^1$ is negative and does not exceed a negative threshold, or a value $S^1 \times 2^{A-C-1}$ is substantially close to a saturation of the neuron. In these cases, the further computation of the neuron can be skipped. If all the values $\{V^0[i]\}$ can be skipped, then method 700 may proceed, in block 745, with calculating $S^1 \times 2^{A-C-1}$ (for example by left binary shift of $S^1$ as the total sum of products $\Sigma_{i=1}^{n} V[i] \times W[i]$.

If values $\{V^0[i]\}$ cannot be skipped, then method may proceed, in block 735, with receiving the plurality of the second parts $\{V^0[i]\}$ of the input values $\{V[i]\}$ and calculating the second result $S^0 = \Sigma_{i=1}^{n} V^0[i] \times W[i]$. The calculation of the second result $S^0$ can be performed in a cycle of blocks similar to the blocks 710, 715, 720, and 725. In block 710, a different criterion can be used to determine that value $V^0[i]$ should be skipped from calculation of sum of the multiplication $V^0[i] \times W[i]$. For example, the value $V^0[i]$ can be skipped if value $V^0[i]$ is less than a threshold. In some embodiments, the value $V^0[i]$ can be also skipped if value $V^0[i]$ is less than a first threshold and the first result $S^1$ exceeds a second threshold. In certain embodiments, the value $V^0[i]$ can be also skipped if the value $V^0[i]$ is less than a percentage of the first result $S^1$.

In the block 750, the method 700 may calculate the total sum of products $\Sigma_{i=1}^{n} V[i] \times W[i]$ as $S = S^0 + S^1 \times s^{A-C-1}$.

It should be noted, that while embodiments described in FIGS. 5, 6, and 7 involve splitting each of the input values $\{V[i]\}$ into two parts, in other embodiments each of input values $\{V[i]\}$ can be split into a set of parts to obtain a set of pluralities of parts of the input values. Each of the plurality of the set of the pluralities of parts of the input values can be further multiplied by a corresponding weight associated with the input values to obtain a set of partial sums. Each of the partial sums can be found as described in FIG. 6 and FIG. 7. Calculations of some of the partial sums can be skipped based on criteria described above with reference to FIG. 7. The total sum of products can be obtained based on the partial sums by shifting, if required, the partial sums by appropriate offsets and adding the shifted partial sums to the total sum.

According to other example embodiments of present disclosure, bitwise product of inputs values V[i] and weights W[i] can be approximately found as a bitwise product V'[i]×W[i] left shifted by an offset value, wherein V'[i] is C bits selected from the input value V[i] and the offset value is an offset of the selected C-bits from a position of the least significant bit in the input value V[i].

Figure 8:
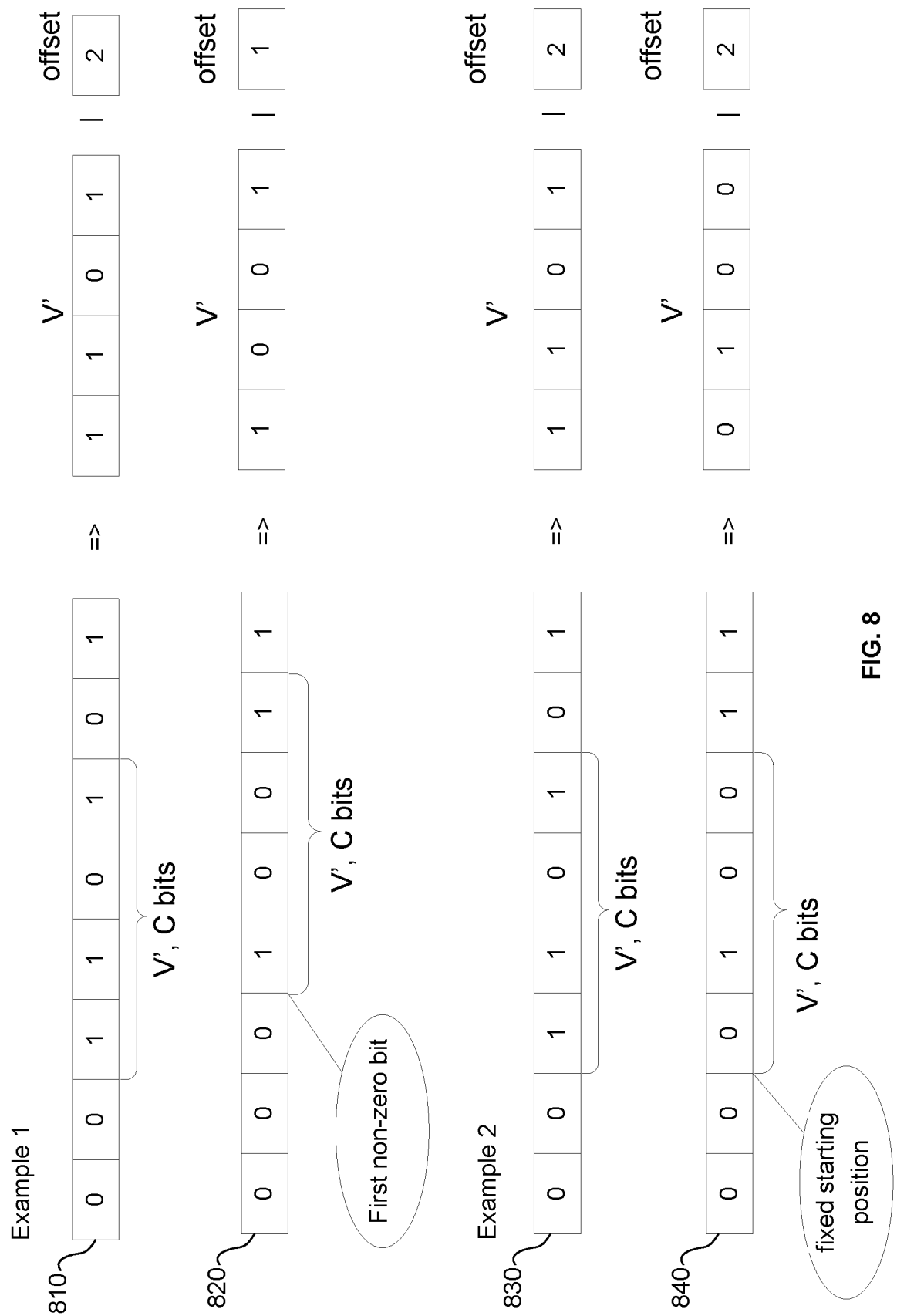
FIG. 8 shows examples of selection of bits from input values.

FIG. 8 shows examples of selection of C bits from input values 810, 820, 830, and 840. In examples of FIG. 8, the number of bits in input values 810, 820, 830, and 840 is 8, the number of selected bits C=4, the selected bits are denoted as V'. In input value 810 the C bits are selected starting from a first non-zero bit at position 6, offset is 2, and the V'=1101. In input value 820 the C bits are selected starting from a first non-zero bit at position 5, offset is 1, and the V'=1001.

In some embodiments, in order to reduce number of operations, the C bits can be selected starting at a pre-determined fixed position. For example, in input values 830 and 840 the C bits can be selected starting from a fixed position 6. In the input value 830, the selected C bits V'=1101. In the input value 840 the selected C bits V'=0100.

In certain embodiments, the C bits can be selected from input value V[i] starting at two or more of pre-determined fixed positions to obtain two or more selected C-bits $V'_l$ and offsets $O_l$. In certain embodiments, the two or more pre-determined fixed positions can be evenly spread between the first bit and the last bit of the A bits to evenly cover the A-bits of the input value V[i]. After obtaining two or more selected C-bits $V'_l$ and offsets $O_l$, a pair of $V'_l$ and $O_l$, corresponding the largest number can be selected for further calculations of V'[i]×W[i]. Number of the starting positions for selection of the C-bits can be less than total number of bits of the input values V[i].

Figure 9:
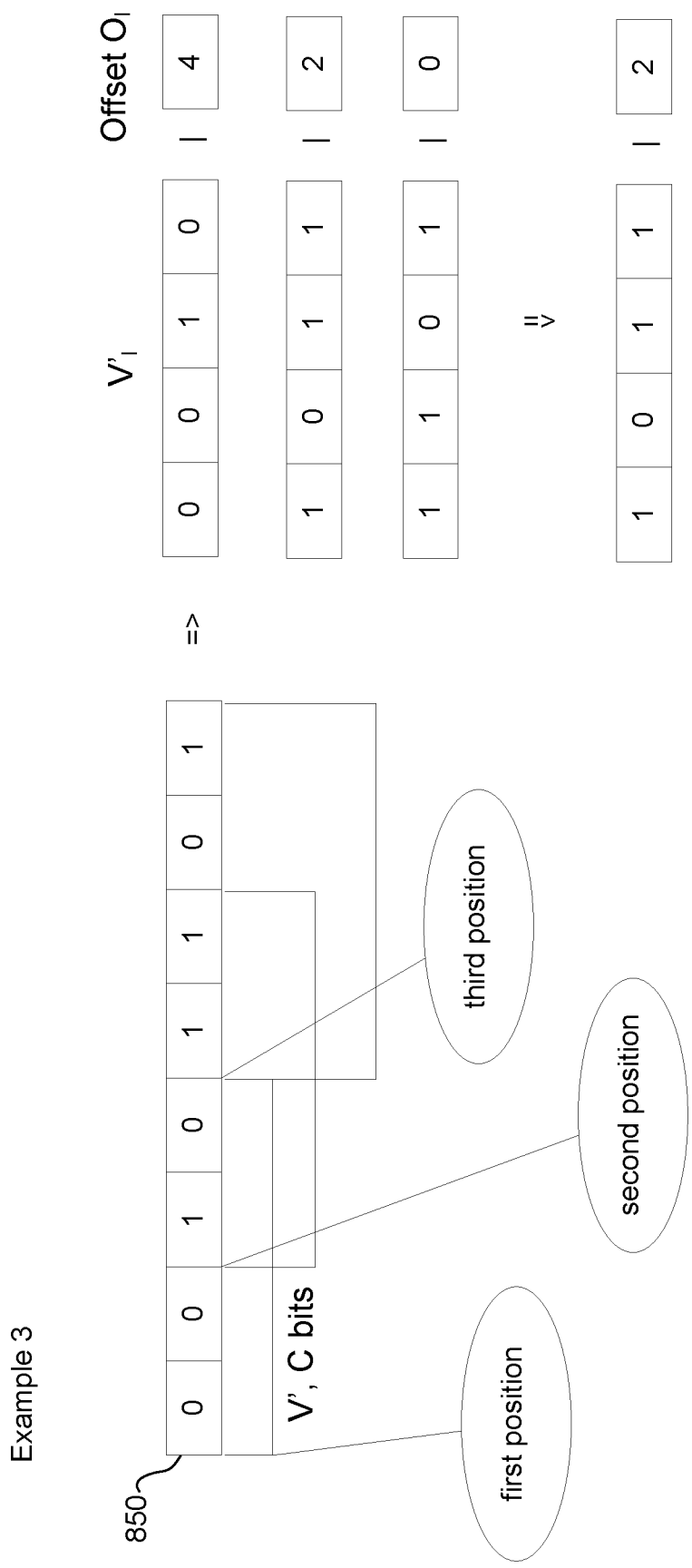
FIG. 9 is a block diagram showing selection of bits from input values.

FIG. 9 is a block diagram showing selection of C bits from input value 850. In example of FIG. 9, the input value 850 represented by 8 bits and C=4. First, three C-bits $V'_l$ are selected at starting positions 8, 6, and 4. The selections are $V'_1$='0010' and offset $O_1$=4, $V'_2$='1011' and offset $O_2$=2, and $V'_3$='1101' and offset $O_3$=4. The pair $V'_2$='1011' and offset $O_2$=2 can be selected for further computations of V'[i]×W[i].

Figure 10:
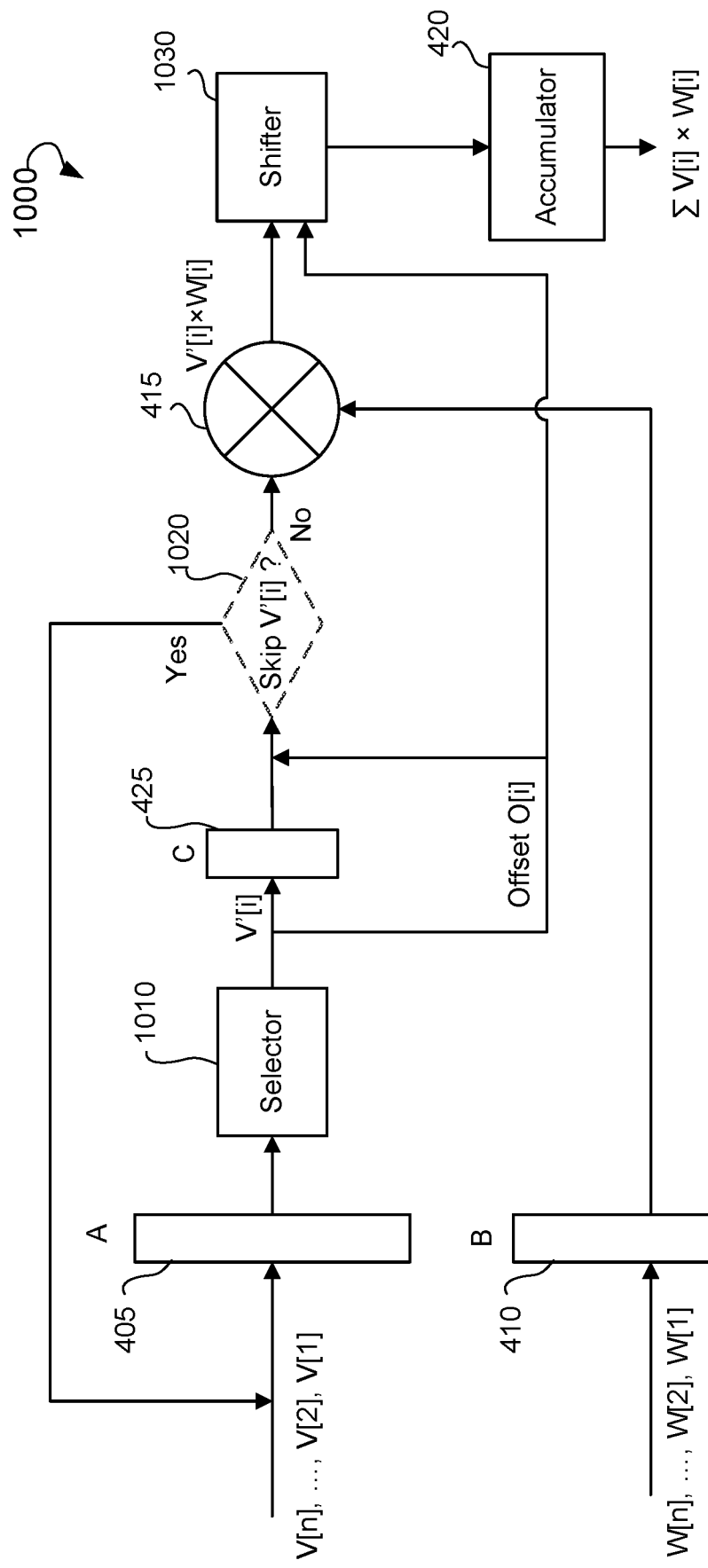
FIG. 10 is a block diagram showing a system for accelerating neuron computations in ANN, according to some example embodiments.

FIG. 10 is a block diagram showing a system 1000 for accelerating neuron computations in ANN, according to some example embodiments. The system 1000 may include an A-bit register 405, a B-bit register 410, a selector 1010, a C-bit register 425, an optional decision unit 1020, an arithmetic unit 415, a shifter 1030, and an accumulator 420.

The system 1000 may receive input values $\{V[i]\}$ for a neuron of ANN in the A-bit register 405 and weights $\{W[i]\}$ (i=1, . . . , n) for the input values in the B-bit register 410. The selector 1010 can be configured to select a C bits V'[i] from the input value V[i] and offset O[i] of the selected C-bits V'[i] from a position of the least significant bit in input value V[i]. The selection of the C-bits can be performed by one of the schemes described in FIG. 8 and FIG. 9.

The decision unit 1020 may determine that value V'[i] can be skipped from the computation of the sum of products V'[i]×W[i]. For example, the value V'[i] can be skipped if offset O[i] does not exceed a pre-determined offset T. The value V'[i] can be skipped if offset O[i] does not exceed a pre-determined offset T and value V'[i] does not exceed a threshold.

The arithmetic unit 415 can perform multiplication of V'[i] and weight W[i] to obtain a product V'[i]×W[i]. The shifter 1030 may further left shift the product V'[i]×W[i] by offset O[i]. It should be noted that C×B bit multiplication and bit shifting by offset may require less bit operations than A×B bit multiplication for computing the product of the product V[i]×W[i].

The accumulator 420 may add the obtained product V'[i]×W[i] to a sum S' which is an approximation for the sum $\Sigma_{i=1}^{n} V[i] \times W[i]$. The sum S' can be further used for computation of an output of the neuron.

Figure 11:
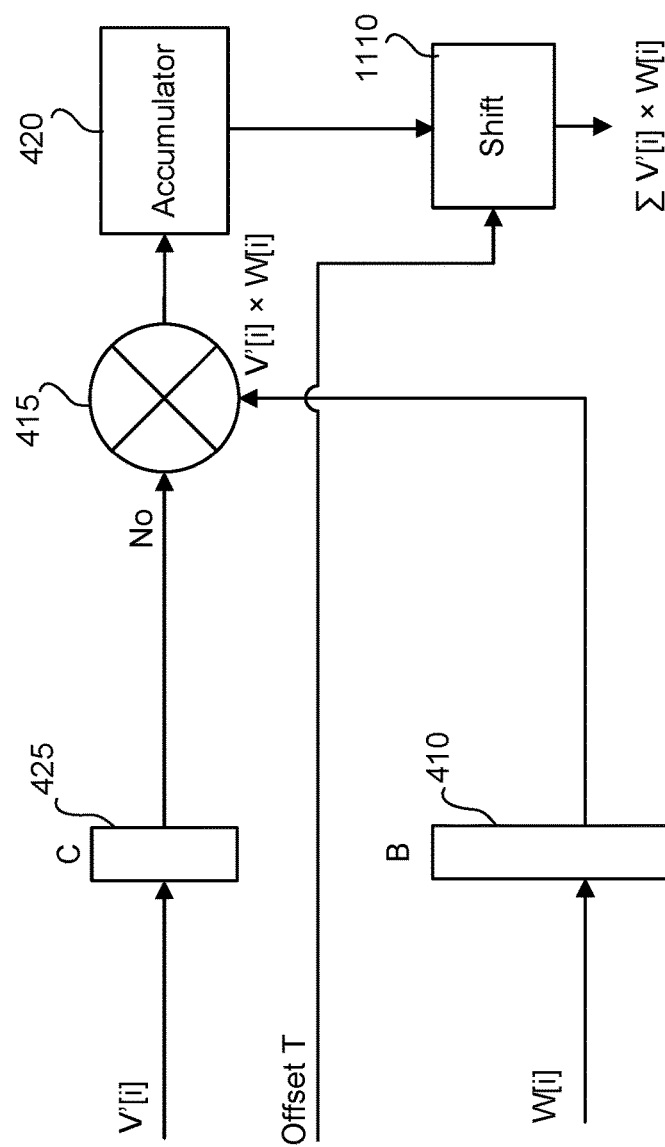
FIG. 11 is a block diagram showing a system for accelerating neuron computations in ANN, according to some example embodiments.

FIG. 11 is a block diagram showing a system 1100 for accelerating neuron computations in ANN, according to some other example embodiments. The system 1100 may include a B-bit register 410, a C-bit register 425, an arithmetic unit 415, an accumulator 420, and a shifter 1110. The system 1100 can be used to compute sum of product V'[i]×W[i], wherein the selected C-bits V'[i] have the same pre-determined offset T.

The system 1100 may receive, in the A-bit register 405, input values V'[i] including C-bits selected from the input values $\{V[i]\}$ for a neuron of ANN and weights $\{W[i]\}$ (i=1, . . . , n) for the input values $\{V[i]\}$ in the B-bit register 410.

The arithmetic unit 415 can perform multiplication of V'[i] and corresponding weight W[i] to obtain a product V'[i]×W[i]. The accumulator 420 may add the obtained product V'[i]×W[i] to a sum S'. The shifter 1110 may further left shift the sum S' by the pre-determined offset T. The sum S' can be further used for computation of an output of the neuron. In comparison to the system 1000 of FIG. 10, the system 1100 may allow to perform operation of shift only one time.

Figure 12:
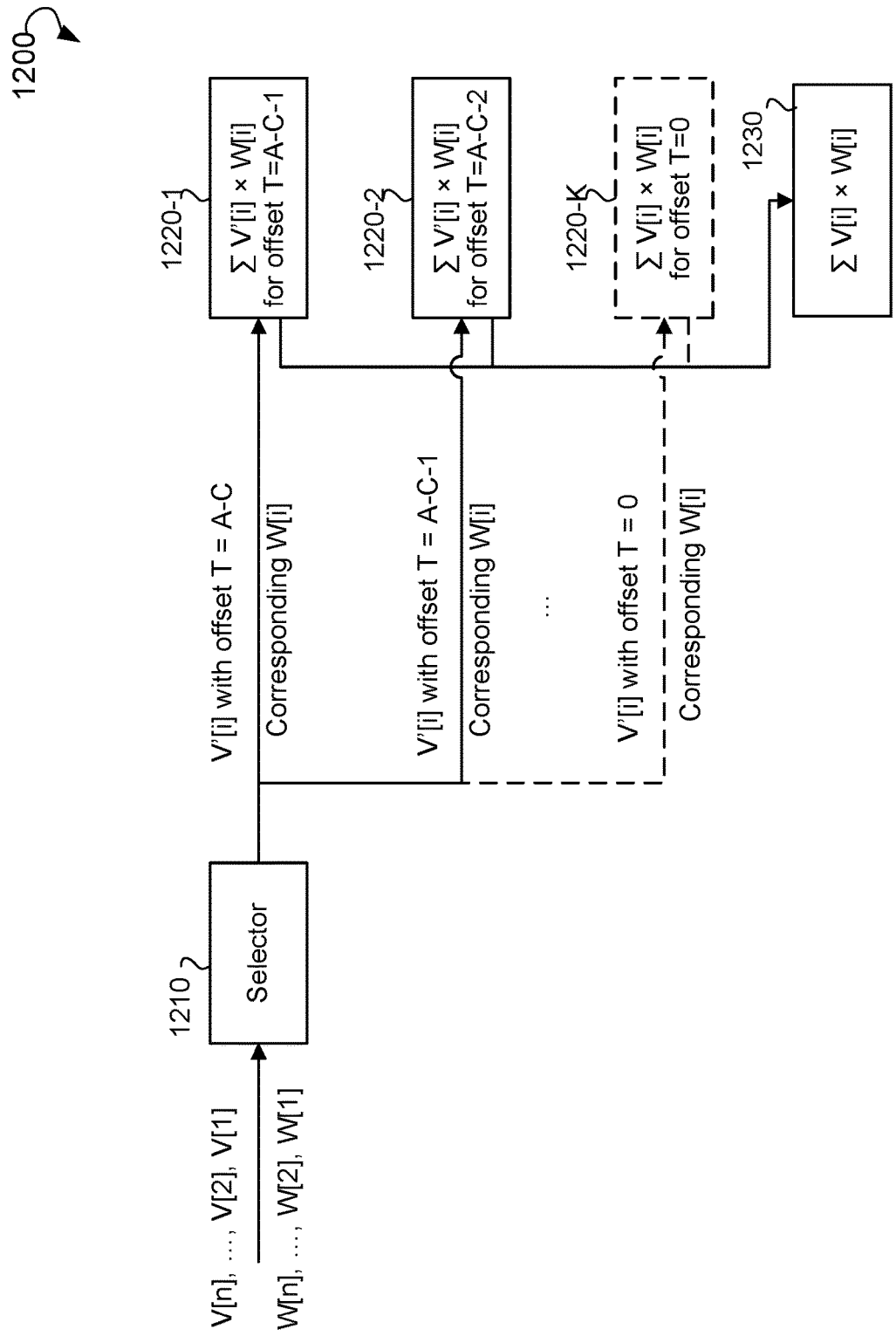
FIG. 12 is a block diagram showing a system for accelerating neuron computations in ANN, according to some example embodiments.

FIG. 12 is a block diagram showing a system 1200 for accelerating neuron computations in ANN, according to some example embodiments. The system 1200 may include a selector 1210, one or more processing units 1220-1 (1=1, . . . ,K), and processing unit 1230.

The selector 1210 may receive input values {V[i]} for a neuron of ANN and weights {W[i]} (i=1, . . . , n) for the input values. The selector 1210 can be configured to select C bits V'[i] from the A-bit input value V[i] and determine offset O[i] of the selected C-bits V'[i] from a position of the least significant bit in the input value V[i]. The selection of the C-bits can be performed by one of the schemes described in FIG. 8 and FIG. 9. The selector 1210 can be further configured to provide values V'[i] with offset T=A−C and corresponding weights W[i] to processing unit 1220-1, values V'[i] with offset T=A−C−1 corresponding weights W[i] to processing unit 1220-2, and so forth.

Each of the processing unit 1220-1 (1=1, . . . ,K) can be configured to compute partial sums of products $S_T = \Sigma_{k=1}^{m} V'[i_k] \times W[i_k]$, wherein the values V'[$i_k$] associated with the same offset T=A−C+1−1 and W[$i_k$] are weights corresponding to V'[$i_k$]. The processing units 1220-1 (1=1, . . . ,K) may include components similar to the components of the system 1100 of FIG. 11. The processing unit 1230 can be configured to compute total sum S of the partial sums $S_T$.

The system 1200 can be configured to compute the partial sums $S_T$ only for offsets T exceeding a pre-determined number and by so exclude computations for V'[i] having lower values. In some embodiments, the system 1200 can be configured to compute the partial sums $S_T$ in parallel. In other embodiments, the system 1200 can be configured to compute the partial sums $S_T$ subsequently starting from the partial sum corresponding to a highest offset T=A−C. The subsequent computation of the partial sums $S_T$ can be stopped if total sum S of the partial sums exceeds a threshold.

It should be noted that while example embodiments described in FIG. 5-12 concern with reducing number of bits of input values V[i] in calculations of neurons of ANN, similar approaches can be used for reducing number of bits in weights W[i]. In some embodiments, number of bits in both input values V[i] and weights W[i] can be reduced in calculation of a neuron. Partial sums of products can be calculated based on parts of bits of weights W[i] and parts of bits of input values V[i]. The partial sums of products can be calculated in an order starting from the most significant partial sum of products, wherein the most significant sum of products is a sum of products of the most significant bits of weights W[i] and the most significant bits of input values V[i]. The computation of the partial sums can be stopped if a value of a sum of partial sums of products satisfies criteria, for example exceeds a positive threshold or does not exceed a negative threshold.

Figure 13:
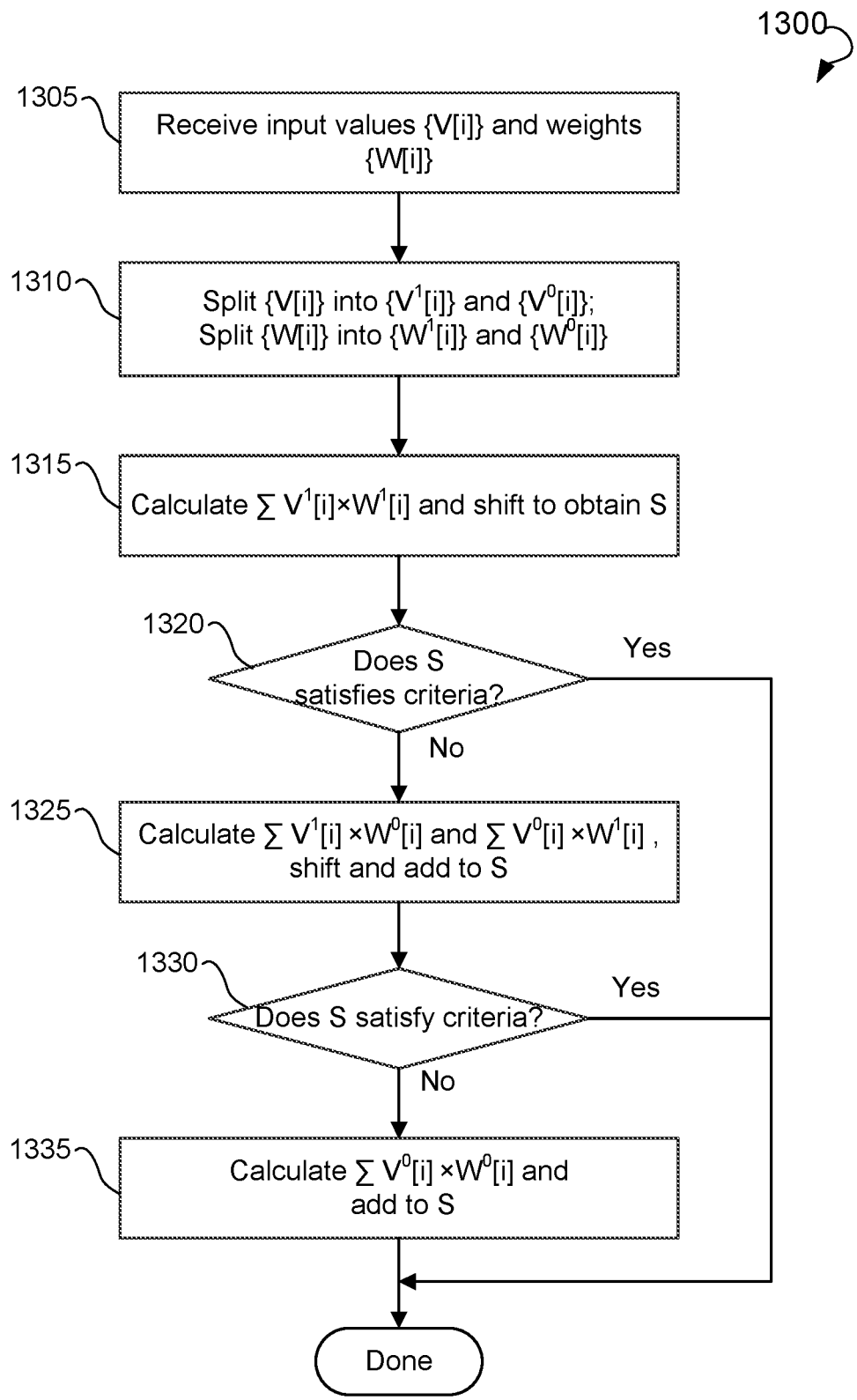
FIG. 13 is a block diagram showing a method for accelerating neuron computations in ANN, according to some example embodiments.

FIG. 13 is a block diagram showing a method 1300 for accelerating neuron computations in ANN, according to some example embodiments. The method 1300 may be performed by system 100 described above with reference to in FIG. 1.

In block 1305, the method 1300 may receive plurality of input values {V[i]} for a neuron of an ANN and plurality of weights {W[i]} for the input values. The input values V[i] can include A bits and the weights can include B bits.

In block 1310, the method 1300 may split each input value V[i] in a first part of C bits and a second part of A-C bits to obtain a plurality of first parts {$V^1$[i]} and plurality of second parts {$V^0$[i]}. Similarly, the method 1300 may split each weight W[i] in a first part of D bits and a second part B-D bits to obtain a plurality of first parts of weights {$W^1$[i]}0 and a plurality of second parts of weights {$W^0$[i]}. The number C can be less than the number A and the number D can be less than the number B.

In block 1315, the method 1300 may calculate sum of products $\Sigma_{i=1}^{n} V^1[i] \times W^1[i]$, wherein the multiplications are C×D bit multiplications. The result can be shifted by A+B−(C+D) bits to obtain partial sum S.

In block 1320, the method 1300 may determine that the partial sum S satisfies criteria. For example, the method 1300 may determine that the partial sum S is positive and exceeds a positive threshold or the partial sum S is negative and does not exceed a negative threshold. In response to the determination, the method 1300 may skip further computations in blocks 1325, 1330, and 1335.

In block 1325, the method 1300 may calculate sum of products $\Sigma_{i=1}^{n} V^1[i] \times W^0[i]$, wherein the multiplications are C×(B−D) bit multiplications. The result can be shifted by A−C bits and added to the partial sum S. The method 1320 may further calculate sum of products $\Sigma_{i=1}^{n} V^0[i] \times W^1[i]$, wherein the multiplications are D×(A−C) bit multiplications. The result can be shifted by B−D bits and added to the partial sum S.

In block 1330, the method 1300 may determine that the partial sum satisfies the criteria. For example, the method 1320 may determine that the partial sum is positive and exceeds a positive threshold or the partial sum is negative and does not exceed a negative threshold. In response to the determination, the method 1300 may skip the further computations in block 1335.

In block 1335, the method 1300 may calculate sum of products $\Sigma_{i=1}^{n} V^0[i] \times W^0[i]$, wherein the multiplications are C×D bit multiplications. The result can be added to the partial sum S.

It should be noted that during computations in blocks 1315, 1325, and 1335, performing multiplication operations can be skipped if at least one of the multiplicands is substantially zero. It is also should be noted, that in other embodiments, the input values {V[i]} and weights {W[i]} can be split into more than two equal or non-equal parts of bits. Each of the input values {V[i]} can be split into a first number of bit parts and each of the weights {W[i]} can be split into a second number of bit parts. The first number can be equal to the second number or the first number can differ from the second number.

Figure 14:
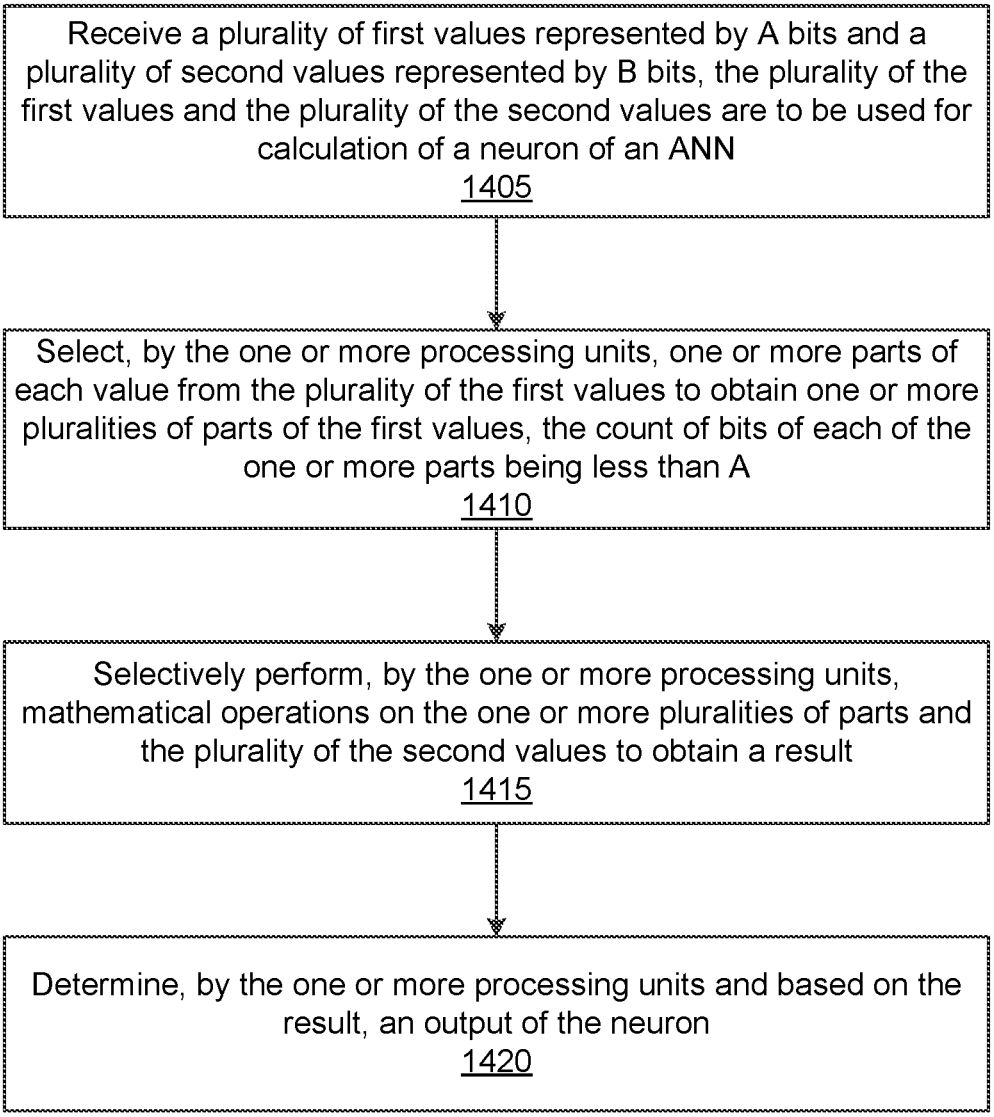
FIG. 14 is a flow chart illustrating a method for accelerating neuron computations in ANN, according to some example embodiments.

FIG. 14 is a flow chart illustrating a method 1400 for accelerating neuron computations in ANN, according to some example embodiments. In some embodiments, the operations of the method 1400 may be combined, performed in parallel, or performed in a different order. The method 1400 can also include additional or fewer operations than those illustrated. The method 1400 may be performed by system 100 described above with reference to FIG. 1.

In block 1405, the method 1400 may commence with receiving a plurality of first values represented by A bits and a plurality of second values represented by B bits. The plurality of the first values can be input values for a neuron of an ANN and the plurality of the second values can be weights for the input values. In other embodiments, the second values can be input values for a neuron of an ANN and the plurality of the first values can be weights for the input values.

In block 1410, the method 1400 may select, by the one or more processing units, one or more parts of each value from the plurality of the first values to obtain one or more pluralities of parts of the first values. The count of bits of each of the parts is less than A.

In block 1415, the method 1400 may selectively perform, by the one or more processing units, mathematical operations on the one or more pluralities of parts and the plurality of the second values to obtain a result.

In block 1420, the method 1400 may determine, by the one or more processing units and based on the result, an output of the neuron.

Figure 15:
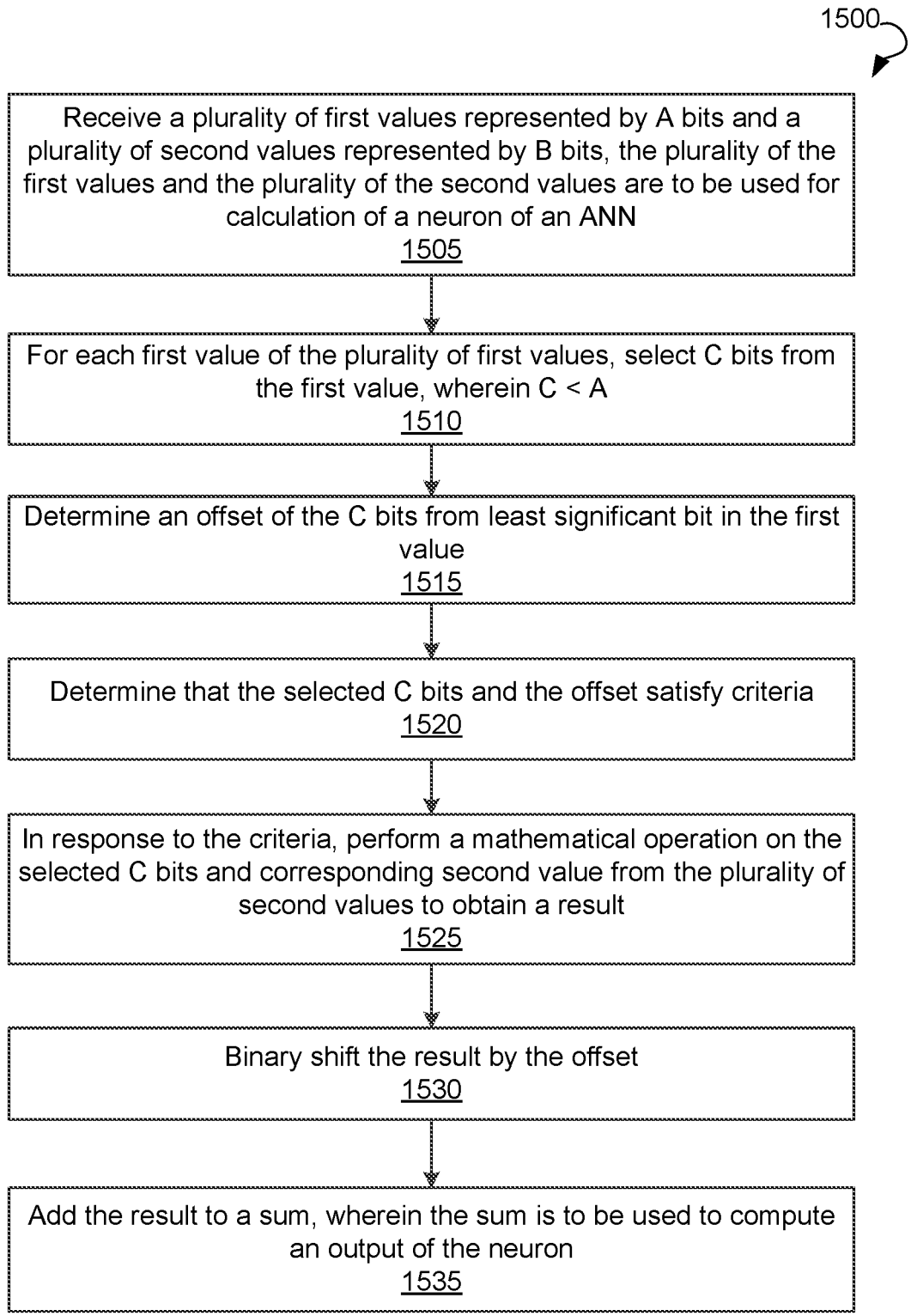
FIG. 15 is a flow chart illustrating a method for accelerating neuron computations in ANN, according to some example embodiments.

FIG. 15 is a flow chart illustrating a method 1500 for accelerating neuron computations in ANN, according to some example embodiments. In some embodiments, the operations of the method 1500 may be combined, performed in parallel, or performed in a different order. The method 1500 may also include additional or fewer operations than those illustrated. The method 1500 may be performed by system 100 described above with reference to in FIG. 1.

In block 1505, the method 1500 may receive a plurality of first values represented by A bits and a plurality of second values represented by B bits. The plurality of the first values can include input values for a neuron of an ANN and the plurality of the second values can include weights for the input values. In other embodiments, the second values can include input values for a neuron of an ANN and the plurality of the first values can include weights for the input values.

For each first value of the plurality of first values, the method 1500 may include, in block 1510, selecting C bits from the first value, wherein C<A. Selecting the C bits from the first value may include selecting C consecutive bits starting with a first non-zero bit after a most significant bit.

In block 1515, the method 1500 may determine an offset of the C bits from a least significant bit in the first value. In block 1520, the method 1500 may determine that the selected C bits and the offset satisfy criteria. The determination may include determining that the offset exceeds a threshold.

In block 1525, in response to the determination that the selected C bits and the offset satisfy criteria, the method 1500 may perform a mathematical operation on the selected C bits and corresponding second value of the plurality of second values to obtain a result. In block 1530, the method 1500 may binary shift the result by the offset. In block 1535, the method 1500 may add the result to a sum, wherein the sum is to be used to compute an output of the neuron.

It should be mentioned that thresholds described above in connection with FIG. 7, FIG. 10, FIG. 12, FIG. 13, and FIG. 15 can be pre-determined or dynamically generated/adjusted during computations of a neuron. The thresholds can be adjusted during the computation of the neuron based on values of partial sums that have been already computed and based on the total sum of the partial sums.

Figure 16:
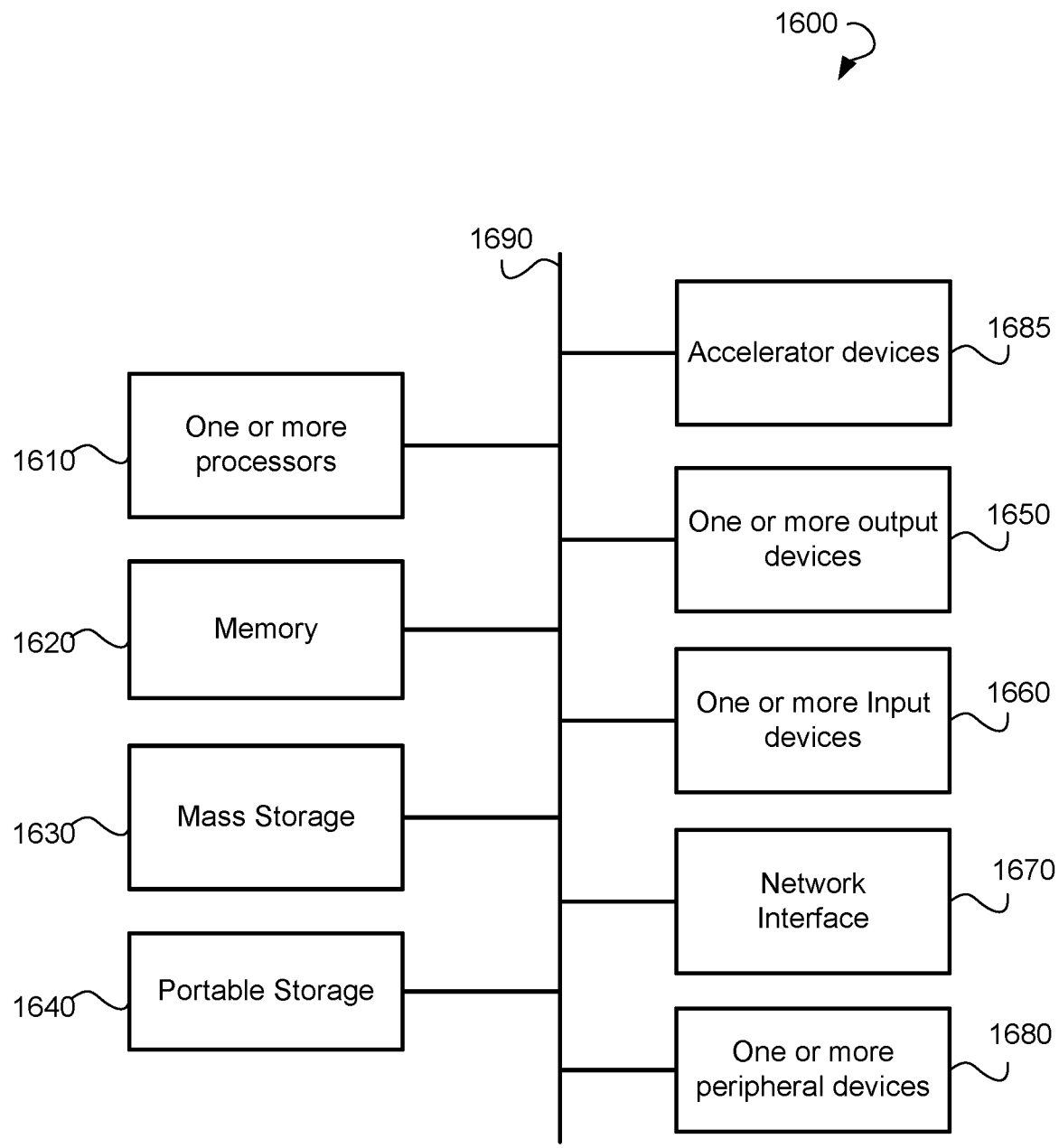
FIG. 16 shows a computing system that can be used to implement embodiments of the disclosed technology.

FIG. 16 illustrates an example computing system 1600 that may be used to implement embodiments described herein. The example computing system 1600 of FIG. 16 may include one or more processors 1610 and memory 1620. Memory 1620 may store, in part, instructions and data for execution by the one or more processors 1610. Memory 1620 can store the executable code when the exemplary computing system 1600 is in operation. The processor 1610 may include internal accelerators like a graphical processing unit, a Field Programmable Gate Array, or similar accelerators that may be suitable for use with embodiments described herein. The memory 1620 may include internal accelerators like a graphical processing unit, a Field Programmable Gate Array, or similar accelerators that may be suitable for use with embodiments described herein. The example computing system 1600 of FIG. 16 may further include a mass storage 1630, portable storage 1640, one or more output devices 1650, one or more input devices 1660, a network interface 1670, and one or more peripheral devices 1680.

The components shown in FIG. 16 are depicted as being connected via a single bus 1690. The components may be connected through one or more data transport means. The one or more processors 1610 and memory 1620 may be connected via a local microprocessor bus, and the mass storage 1630, one or more peripheral devices 1680, portable storage 1640, and network interface 1670 may be connected via one or more input/output buses.

Mass storage 1630, which may be implemented with a magnetic disk drive, an optical disk drive or a solid state drive, is a non-volatile storage device for storing data and instructions for use by a magnetic disk, an optical disk drive or SSD, which in turn may be used by one or more processors 1610. Mass storage 1630 can store the system software for implementing embodiments described herein for purposes of loading that software into memory 1620. The mass storage 1630 may also include internal accelerators like a graphical processing unit, a Field Programmable Gate Array, or similar accelerators that may be suitable for use with embodiments described herein.

Portable storage 1640 may operate in conjunction with a portable non-volatile storage medium, such as a compact disk (CD) or digital video disc (DVD), to input and output data and code to and from the computing system 1600 of FIG. 16. The system software for implementing embodiments described herein may be stored on such a portable medium and input to the computing system 1600 via the portable storage 1640.

One or more input devices 1660 provide a portion of a user interface. The one or more input devices 1660 may include an alphanumeric keypad, such as a keyboard, for inputting alphanumeric and other information, or a pointing device, such as a mouse, a trackball, a stylus, or cursor direction keys. Additionally, the computing system 1600 as shown in FIG. 16 includes one or more output devices 1650. Suitable one or more output devices 1650 include speakers, printers, network interfaces, and monitors.

Network interface 1670 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 1670 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 1680 may include any type of computer support device to add additional functionality to the computing system. The one or more peripheral devices 1680 may include a modem or a router.

The example computing system 1600 of FIG. 16 may also include one or more accelerator devices 1685. The accelerator devices 1685 may include PCIe-form-factor boards or storage-form-factor boards, or any electronic board equipped with a specific electronic component like a Graphical Processing Unit, a Neural Processing Unit, a Multi-CPU component, a Field Programmable Gate Array component, or similar accelerators electronic or photonic components, that may be suitable for use with embodiments described herein.

The components contained in the exemplary computing system 1600 of FIG. 16 are those typically found in computing systems that may be suitable for use with embodiments described herein and are intended to represent a broad category of such computer components that are well known in the art. Thus, the exemplary computing system 1600 of FIG. 16 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, SSD, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. The instructions or data may not be used by the CPU but be accessed in writing or reading from the other devices without having the CPU directing them.

Thus, systems and methods for accelerating ANN computations are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system comprising:
 a computational circuit including:
  a first register configured to store a first operand;
  a second register configured to store a second operand; and
  a storage configured to accumulate products of the first operand and the second operand; and
 a processing unit configured to:
  acquire a plurality of first values and a plurality of second values, the plurality of first values and the plurality of second values being used for calculation of a neuron of an artificial neural network (ANN); and
  for consecutive first values of the plurality of first values:
   split the first values into first parts and second parts, wherein the first parts start at a predetermined position selected from one or more predetermined bit positions of the first values;
   in response to the first parts satisfying first criteria for including the first parts in the calculation of the neuron:
    select the first parts to be stored in the first register;
    store the first parts in the first register; and
    store second values of the plurality of second values in the second register, the second values corresponding to the first values; and
   calculate first products of the first parts and the second values, wherein a first number of bitwise operations for calculating the first products based on the first parts is less than a second number of bitwise operations for calculating the first products based on the first values including the first parts and the second parts, thereby causing the processing unit to perform a fewer number of the bitwise operations and use a fewer number of bits in the storage for storing the first products;
  wherein the storage accumulates the first products of the first parts and the second values as a first result.

2. The system of claim 1, wherein the processing unit is further configured to:
 in response to the first result satisfying second criteria for ending the calculation of the neuron, calculate a value of the neuron based on the first result.

3. The system of claim 2, wherein the second criteria include one of the following:
 the first result exceeds a predetermined positive threshold; and
 the first result does not exceed a predetermined negative threshold.

4. The system of claim 1, wherein the processing unit is further configured to:
 in response to the second parts satisfying second criteria for including the second parts in the calculation of the neuron, store the second parts in the first register and the second values in the second register, the second values corresponding to the first values, wherein the storage accumulates second products of the second parts and the second values as a second result; and calculate a value of the neuron based on the first result and the second result.

5. The system of claim 4, wherein the second criteria include that the second parts exceed a predetermined threshold.

6. The system of claim 4, wherein the second criteria include that the second parts exceed a predetermined first threshold and the first result does not exceed a predetermined second threshold.

7. The system of claim 4, wherein the second criteria include that the second parts exceed a predetermined percentage of the first result.

8. The system of claim 1, wherein a number of bits in the first parts corresponds to a bit size of the first register.

9. The system of claim 1, wherein a bit size of the first register is less than a number of bits of the first values.

10. The system of claim 1, wherein the first parts include first C bits of the first values, the first C bits starting with a most significant bit in the first values.

11. The system of claim 1, wherein the first parts include C bits of the first values and the second parts includes one of the following: C, C+1, and C−1 further bits of the first values.

12. The system of claim 1, wherein one of:
the plurality of first values includes inputs of the neuron of the ANN and the plurality of the second values includes weights associated with the inputs of the neuron; and
the plurality of first values includes the weights associated with the inputs of the neuron of the ANN and the plurality of the second values includes the inputs of the neuron of the ANN.

13. The system of claim 1, wherein the processing unit includes at least one electronic component accelerating computation of one or more neurons of the ANN.

14. A system comprising:
a computational circuit including:
a first register configured to store a first operand;
a second register configured to store a second operand; and
a storage configured to accumulate products of the first operand and the second operand; and
a processing unit configured to:
acquire a plurality of first values and a plurality of second values, the plurality of first values and the plurality of second values being used for calculation of a neuron of an artificial neural network (ANN); and
for consecutive first values of the plurality of first values:
select, from the first values, parts to be stored in the first register, wherein the parts start at a predetermined position different from a position of a most significant bit of the first values and a last bit of the parts being different from a least significant bit of the first values and the predetermined position is selected from one or more predetermined bit positions of the first values;
in response to the parts and an offset of the parts from the least significant bit in the first values satisfying criteria for including the parts in the calculation of the neuron:
store the parts in the first register; and
store second values of the plurality of second values in the second register, the second values corresponding to the first values;
calculate products of the parts and the second values, wherein a first number of bitwise operations for calculating the products based on the parts is less than a second number of bitwise operations for calculating the products based on the first values including the parts and further parts, thereby causing the processing unit to perform a fewer number of the bitwise operations and use a fewer number of bits in the storage for storing the products;
wherein the storage accumulates the products of the parts and the second values as a result;
perform a binary shift of the result by the offset; and
add the result to a sum, wherein the sum is to be used to compute an output of the neuron.

15. The system of claim 14, wherein the selecting the parts from the first values includes selecting a predetermined number of consecutive bits starting with a first non-zero bit after the most significant bit in the first values.

16. The system of claim 14, wherein the criteria include that the offset exceeds a threshold.

17. The system of claim 16, wherein the threshold depends on a value of the sum.

18. A method comprising:
acquiring, by a processing unit, a plurality of first values and a plurality of second values, the plurality of first values and the plurality of second values being used for calculation of a neuron of an artificial neural network (ANN), wherein the processing unit is in communication with a computational circuit and includes:
a first register configured to store a first operand;
a second register configured to store a second operand; and
a storage configured to accumulate products of the first operand and the second operand; and
for consecutive first values of the plurality of first values:
splitting, by the processing unit, the first values into first parts and second parts, wherein the first parts start at a predetermined position selected from one or more predetermined bit positions of the first values;
in response to the first parts satisfying first criteria for including the first parts in the calculation of the neuron:
selecting, by the processing unit, the first parts to be stored in the first register;
storing, by the processing unit, the first parts in the first register; and
storing, by the processing unit, second values of the plurality of second values in the second register, the second values corresponding to the first values; and
calculating, by the processing unit, first products of the first parts and the second values, wherein a first number of bitwise operations for calculating the first products based on the first parts is less than a second number of bitwise operations for calculating the first products based on the first values including the first parts and the second parts, thereby causing the processing unit to perform a fewer number of the bitwise operations and use a fewer number of bits in the storage for storing the first products;
wherein the storage accumulates the first products of the first parts and the second values as a first result.

* * * * *